(12) United States Patent
Ramesh Babu et al.

(10) Patent No.: US 12,100,186 B2
(45) Date of Patent: Sep. 24, 2024

(54) LEAF NODE COMPRESSION WITH COMPRESSIBILITY PREDICTION

(71) Applicant: QUALCOMM Incorporated, San Diego, CA (US)

(72) Inventors: Adimulam Ramesh Babu, San Diego, CA (US); Srihari Babu Alla, San Diego, CA (US); David Kirk McAllister, Holladay, UT (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/650,071

(22) Filed: Feb. 4, 2022

(65) Prior Publication Data

US 2023/0252685 A1 Aug. 10, 2023

(51) Int. Cl.
*G06T 9/40* (2006.01)
*G06T 9/00* (2006.01)
*G06T 17/10* (2006.01)

(52) U.S. Cl.
CPC .............. *G06T 9/40* (2013.01); *G06T 9/001* (2013.01); *G06T 17/10* (2013.01); *G06T 2210/12* (2013.01)

(58) Field of Classification Search
CPC ........... G06T 9/001; G06T 9/40; G06T 15/06; G06T 17/10; G06T 2210/12
See application file for complete search history.

(56) References Cited

U.S. PATENT DOCUMENTS

| | | | |
|---|---|---|---|
| 10,032,289 B2 | 7/2018 | Laine et al. | |
| 10,740,952 B2 | 8/2020 | Laine et al. | |
| 10,839,475 B2 | 11/2020 | Benthin et al. | |
| 10,866,990 B2 * | 12/2020 | Lehtinen | G06T 15/80 |
| 2017/0178387 A1 * | 6/2017 | Woop | G06T 15/08 |
| 2017/0236335 A1 * | 8/2017 | Endresen | G06T 17/10 |
| | | | 345/420 |
| 2018/0373809 A1 * | 12/2018 | Ylitie | G06T 15/06 |
| 2021/0304484 A1 | 9/2021 | Saleh et al. | |

(Continued)

OTHER PUBLICATIONS

Meister et al. "A survey on bounding volume hierarchies for ray tracing." Computer Graphics Forum. vol. 40. No. 2. 2021. (Year: 2021).*

(Continued)

*Primary Examiner* — Katrina R Fujita
(74) *Attorney, Agent, or Firm* — QUALCOMM Incorporated

(57) ABSTRACT

Aspects presented herein relate to methods and devices for graphics processing including an apparatus, e.g., a GPU or CPU. The apparatus may allocate each of a plurality of primitives in a scene into one of a plurality of bounding boxes, each of the plurality of bounding boxes corresponding to a plurality of nodes including internal nodes and leaf nodes. The apparatus may also identify whether each of the plurality of nodes is one of the internal nodes or one of the leaf nodes. Further, the apparatus may estimate a compressibility of each of the plurality of nodes if the node is one of the leaf nodes, the compressibility of the node corresponding to whether the node is compressible. The apparatus may also compress data corresponding to each of the plurality of nodes if the node is estimated to be compressible.

27 Claims, 14 Drawing Sheets

(56) References Cited

U.S. PATENT DOCUMENTS

2022/0051467 A1\* 2/2022 Woop ..................... G06T 15/06

OTHER PUBLICATIONS

Afra A.T., "Interactive Ray Tracing of Large Models Using Voxel Hierarchies", Computer Graphics Forum, Journal of the European Association for Computer Graphics, Wiley-blackwell, Oxford, vol. 31, No. 1, Jan. 26, 2012, pp. 75-88, XP071488193.
Benthin C., et al., "Compressed-Leaf Bounding volume Hierarchies (Originally Submitted, Un-shortened Version)", Jul. 1, 2018, pp. 1-6, XP055679686, abstract, p. 3, paragraph 4.2, p. 4, paragraph 4.5.
International Search Report and Written Opinion—PCT/US2023/010509—ISA/EPO—Apr. 21, 2023.

\* cited by examiner

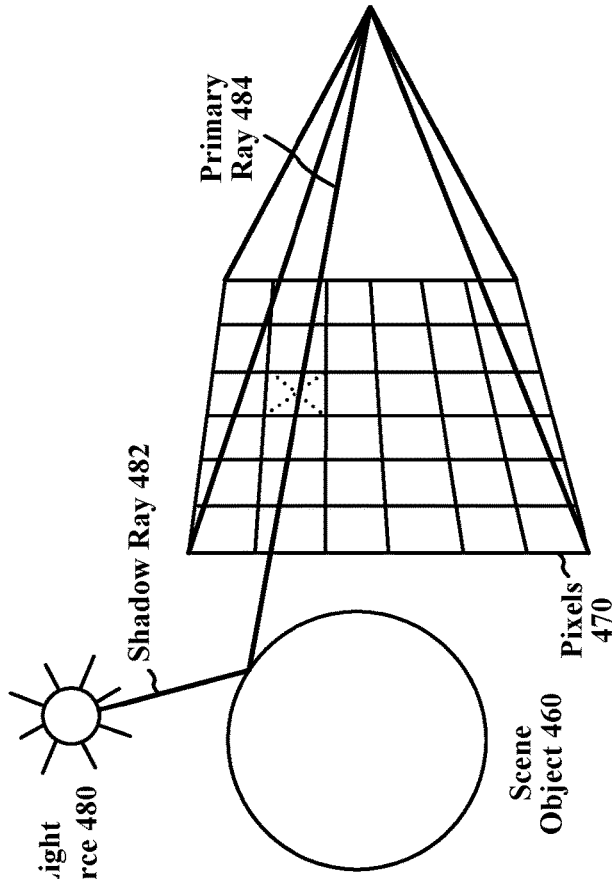
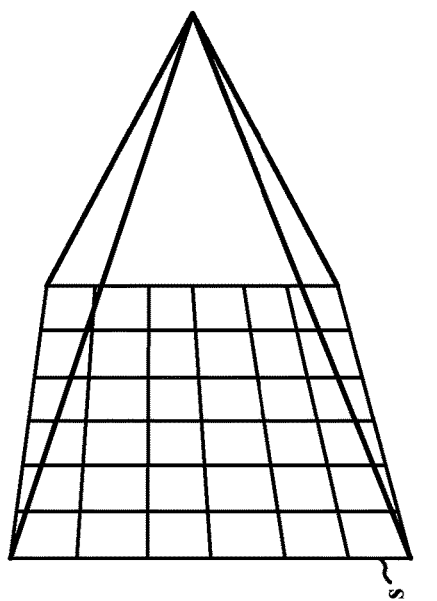
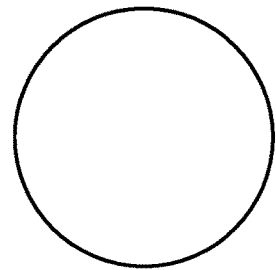

LEAF NODE COMPRESSION WITH COMPRESSIBILITY PREDICTION

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes. The apparatus may also identify whether each of the plurality of nodes is one of the one or more internal nodes or one of the one or more leaf nodes. Additionally, the apparatus may estimate a compressibility of each of the plurality of nodes if the node is one of the one or more leaf nodes, the compressibility of the node corresponding to whether the node is compressible. The apparatus may also compress data corresponding to each of the plurality of nodes if the node is estimated to be compressible. The apparatus may also adjust at least one of a position of the plurality of primitives or a vertex order of the plurality of primitives upon compressing the data corresponding to each of the plurality of nodes. Moreover, the apparatus may encode the data corresponding to each of the plurality of nodes prior to storing the data corresponding to the node, such that the data corresponding to the node is stored in an encoded format. The apparatus may also store the data corresponding to each of the plurality of nodes upon compressing the data corresponding to the node.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example rasterization process.

FIG. 4B is a diagram illustrating an example ray tracing process.

DETAILED DESCRIPTION

Figure 1:
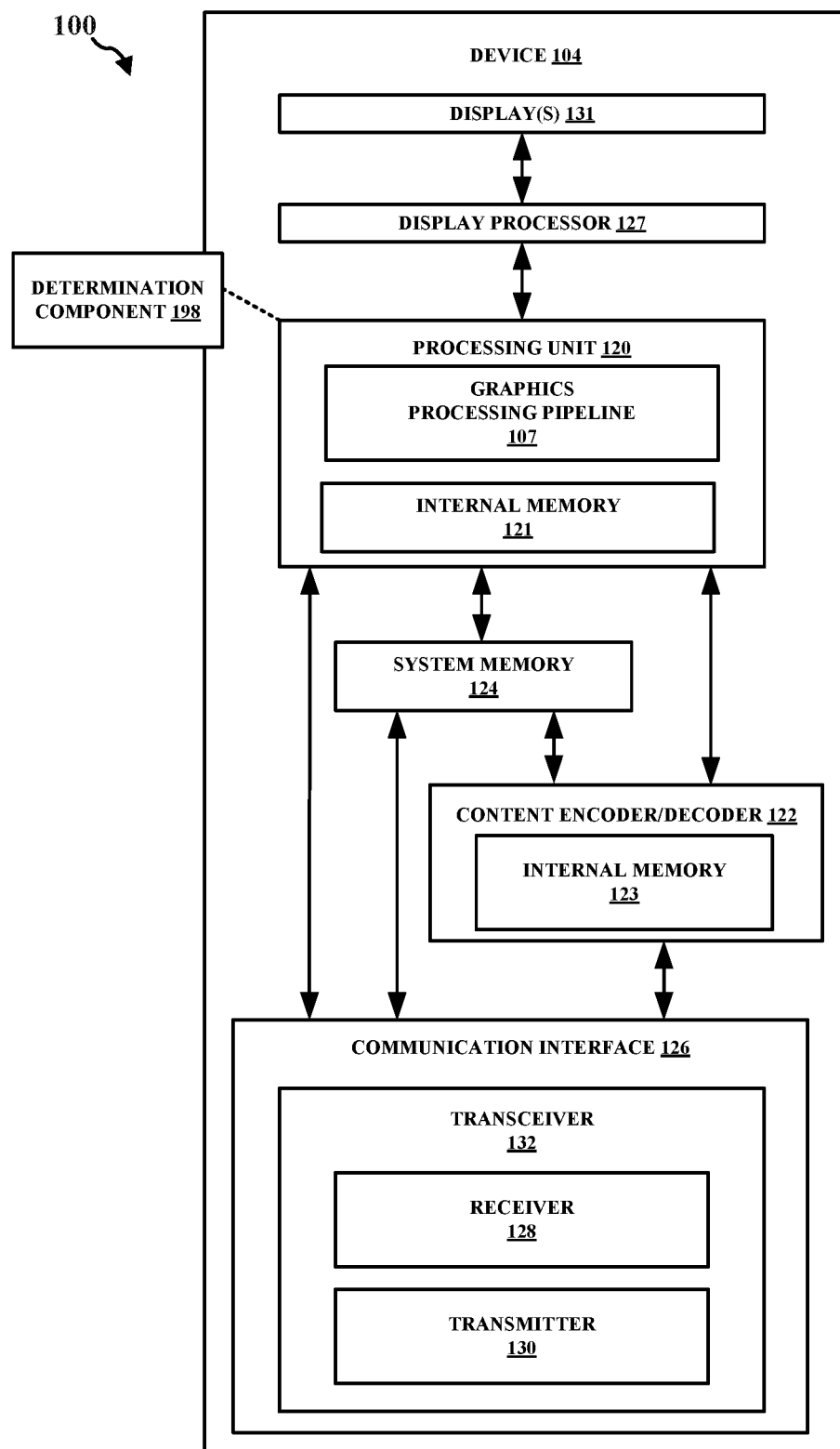
FIG. 1 is a block diagram that illustrates an example content generation system.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU). Ray tracing utilizes (geometric) primitives such as points, lines, or polygons, e.g., triangles or quads, to represent complex objects. In the present disclosure, triangles are presented as an example for primitives. The disclosed techniques are, however, equally applicable to other geometric primitives including any other shape. A triangle primitive may include three vertices, and each one of the three vertices may include a 3D coordinate, e.g., represented as an ordered set of three floating-point values. In order to improve ray tracing performance, primitive data, e.g., geometric data such as vertex coordinate values of a (geometric) primitive, global or local identifiers or indices, or the like, may be stored in certain nodes. For example, primitive data may be directly stored in leaf nodes in fixed size blocks that are equal in size to a cache line, e.g., within the GPU. By doing so, a GPU may be able to fetch a cache line and access it efficiently. For certain types of GPUs, an amount of primitives/triangles may be stored in a leaf node of a certain size. One challenge may be to fit a certain amount of data for a certain amount of primitives/triangles into a memory of a smaller size. In some instances of ray tracing, while attempting different combinations of data (triangles and/or vertices), a certain combination may be discovered that can be compressed into a specified (target) size. However, when data cannot be compressed into the specified size, every combination may be attempted in order to determine that the data is not compressible. This process consumes a lot of cycles that exhaust all the combinations and may result in no useful output. In some instances, less than half of the triangle nodes may be compressible. Failing this number of nodes (e.g., 50% of nodes) may take a large amount of time compared to solely processing compressed nodes. Further, it may not be possible to perform the compression in real time to attempt all the permutations within the allocated ray tracing frame time. Aspects of the present disclosure may reduce the amount of compression time for ray tracing procedures without compromising ray tracing performance. For instance, aspects of the present disclosure may reduce the amount of compression time while maintaining to pack/store a desirable amount of primitives/triangles in a leaf node, such that ray tracing performance is not compromised. In order to do so, aspects of the present disclosure may introduce a prediction function before a compression stage. The prediction function according to aspects presented herein may predict the leaf node compressibility in order to filter out most of the non-compressible nodes. Aspects presented herein may also predict the leaf node compressibility without eliminating any compressible nodes. Additionally, the prediction functions according to aspects presented herein may not return any inaccuracies (e.g., false negatives) regarding node compression.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to allocate each of a plurality of primitives in a scene into one of a plurality of bounding boxes, each of the plurality of primitives including one or more vertices (e.g., three vertices), each of the plurality of bounding boxes corresponding to a plurality of nodes including one or more internal nodes and one or more leaf nodes. The determination component 198 may also be configured to identify whether each of the plurality of nodes is one of the one or more internal nodes or one of the one or more leaf nodes. The determination component 198 may also be configured to estimate a compressibility of each of the plurality of nodes if the node is one of the one or more leaf nodes, the compressibility of the node corresponding to whether the node is compressible. The determination component 198 may also be configured to compress data corresponding to each of the plurality of nodes if the node is estimated to be compressible. The determination component 198 may also be configured to adjust at least one of a position of the plurality of primitives or a vertex order of the plurality of primitives upon compressing the data corresponding to each of the plurality of nodes. The determination component 198 may also be configured to encode the data corresponding to each of the plurality of nodes prior to storing the data corresponding to the node, such that the data corresponding to the node is stored in an encoded format. The determination component 198 may also be configured to store the data corresponding to each of the plurality of nodes upon compressing the data corresponding to the node. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher, a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a vertex fetcher, may use these states to determine certain functions, e.g., how a vertex is assembled. As these modes or states may change, GPUs may need to change the corresponding context. Additionally, the workload that corresponds to the mode or state may follow the changing mode or state.

Figure 2:
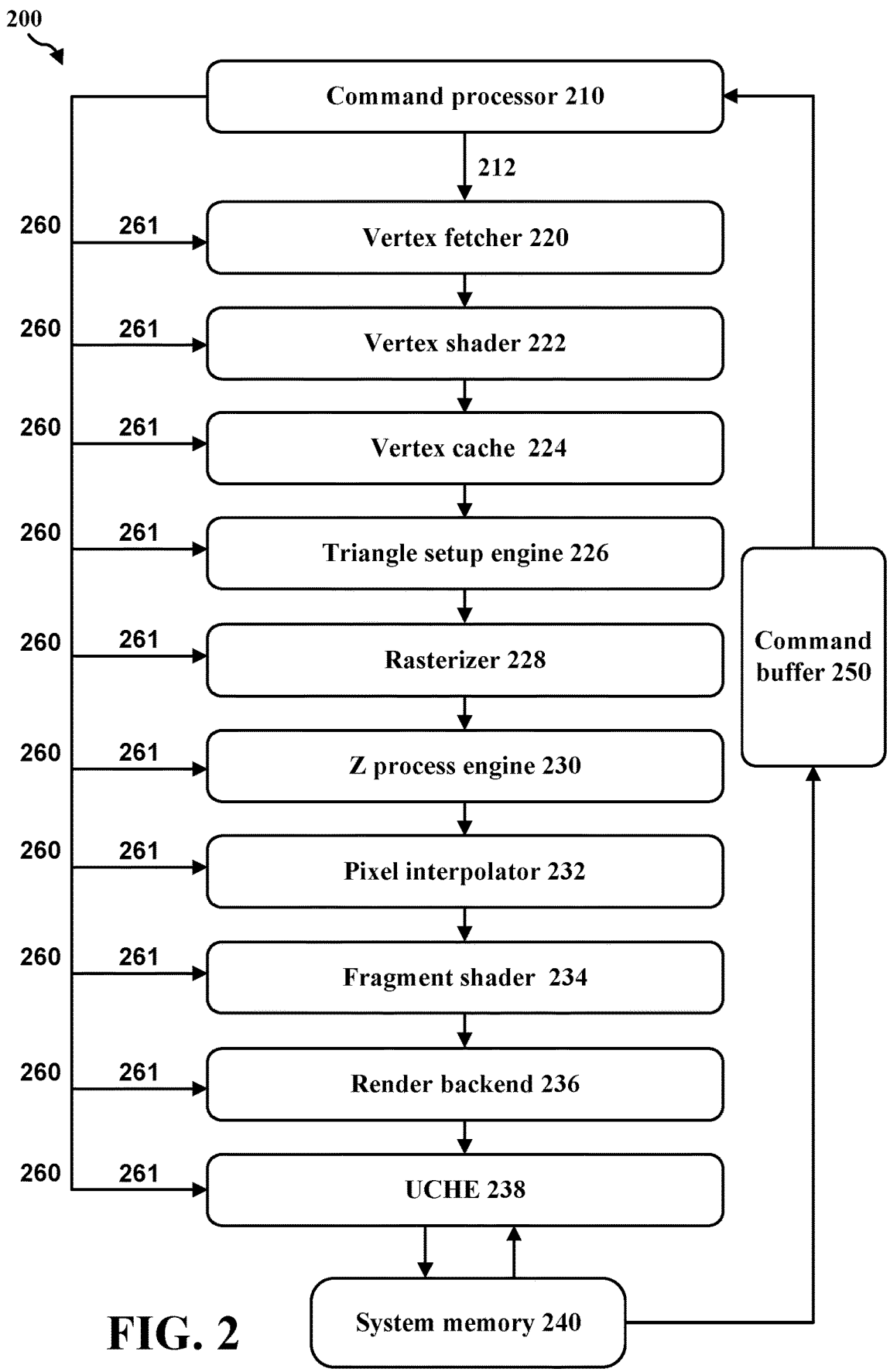
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, vertex fetcher 220, VS 222, vertex cache (VPC) 224, triangle setup engine 226, rasterizer 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
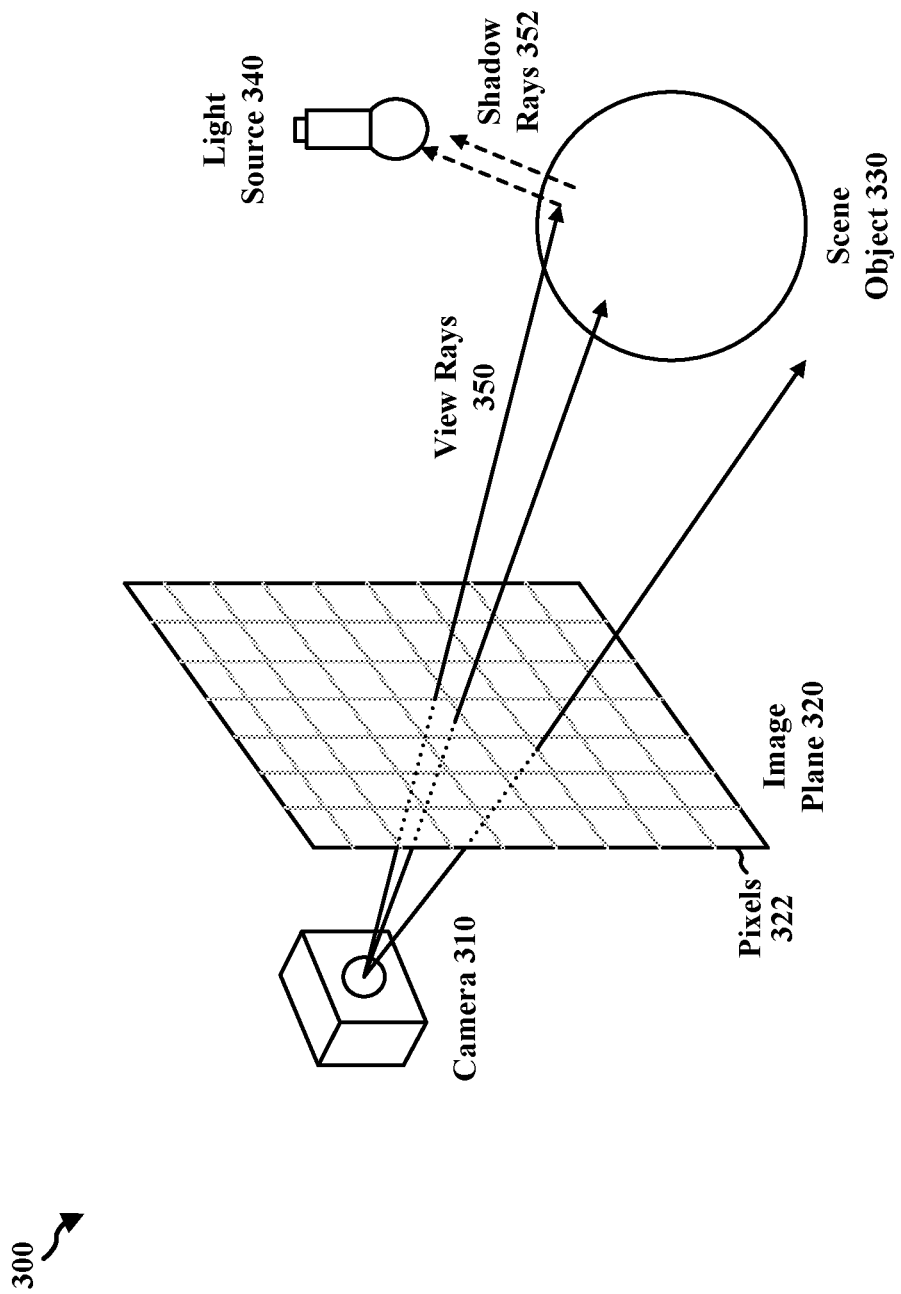
FIG. 3 is a diagram illustrating an example ray tracing process.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340 to camera 310. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside rasterization, such as via a hybrid ray tracing/rasterization model.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if at least a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or strike a certain primitive in scene object 460 corresponding to one of the pixels 470 via primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to strike primitives in a scene ($t_{min}$), a maximum time to strike primitives in a scene ($t_{max}$), and a calculated distance to strike primitives in the scene.

Figure 5:
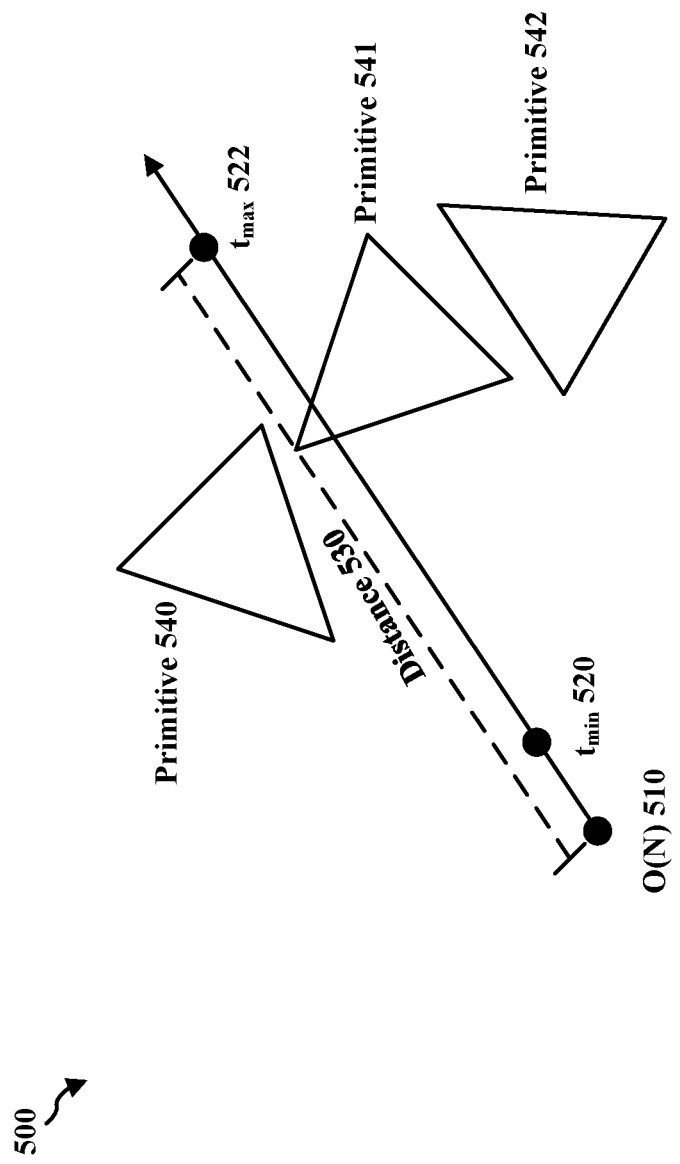
FIG. 5 is a diagram illustrating an example ray tracing process.

FIG. 5 illustrates diagram 500 including one example of a ray tracing process involving triangles as primitives. As shown in FIG. 5, diagram 500 includes origin point for a ray (O(N) 510), a minimum time to strike primitives in a scene ($t_{min}$ 520), a maximum time to strike primitives in a scene ($t_{max}$ 522), a calculated distance to strike primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will strike a primitive, ray tracing techniques may utilize an origin point for a ray (O(N) 510), a minimum time to strike primitives ($t_{min}$ 520), a maximum time to strike primitives ($t_{max}$ 522), a calculated distance to strike primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal or inner nodes may hold bounding boxes/volumes, such as axis-aligned bounding boxes (AABBs), defined by a pair of bounding planes in each of three dimensions, that enclose certain leaf node geometry. Each of the AABBs may include one or more (geometric) primitives, where the number of primitives within each AABB may vary. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
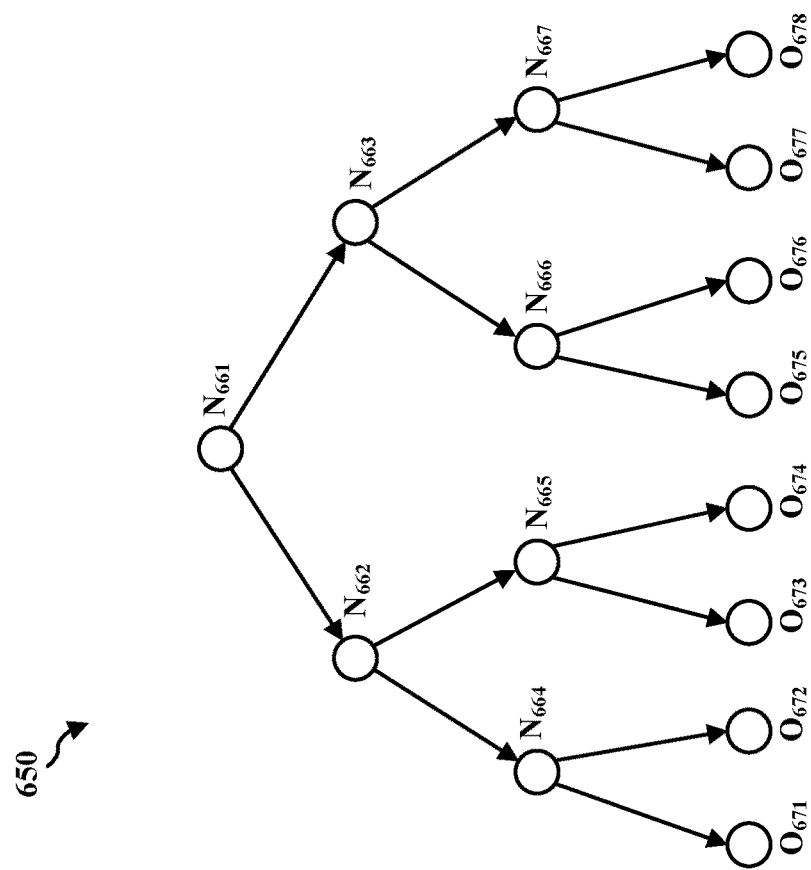
FIG. 6B is a diagram illustrating an example data structure.
Figure 6A:
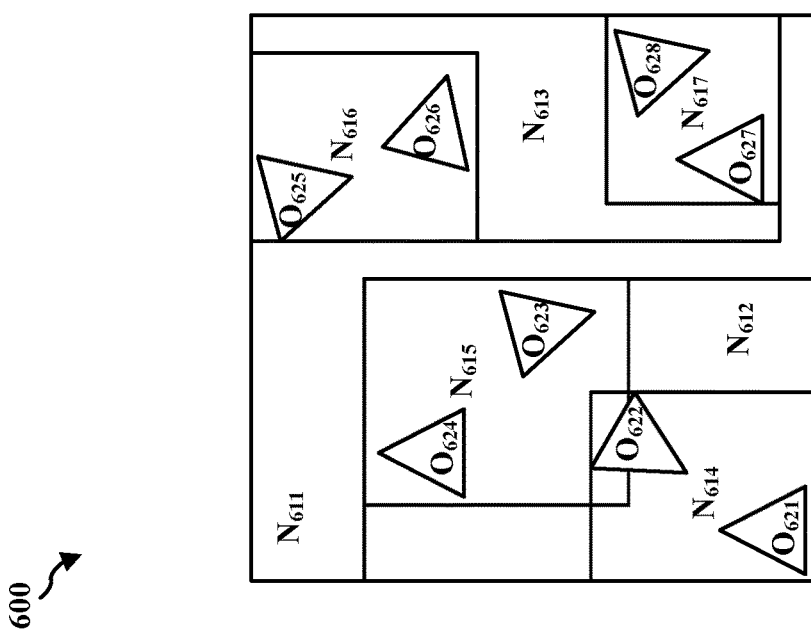
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (nodes $N_{611}$-$N_{617}$) and a number of primitives (primitives $O_{621}$-$O_{628}$). FIG. 6A depicts a ray-box intersection for nodes $N_{611}$-$N_{617}$ and primitives 0621 — 0628. As shown in FIG. 6B, diagram 650 includes a number of nodes (nodes $N_{661}$-$N_{667}$) and a number of primitives (primitives $O_{671}$-$O_{678}$). FIG. 6B depicts a ray-triangle test for nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process.

For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (e.g., a BVH) to a wide BVH (e.g., an 8-branch wide BVH). In some instances of BVH widening, an internal node may include up to eight AABBs and a leaf node may include up to four primitives or triangles.

Figures 7A, 7B:
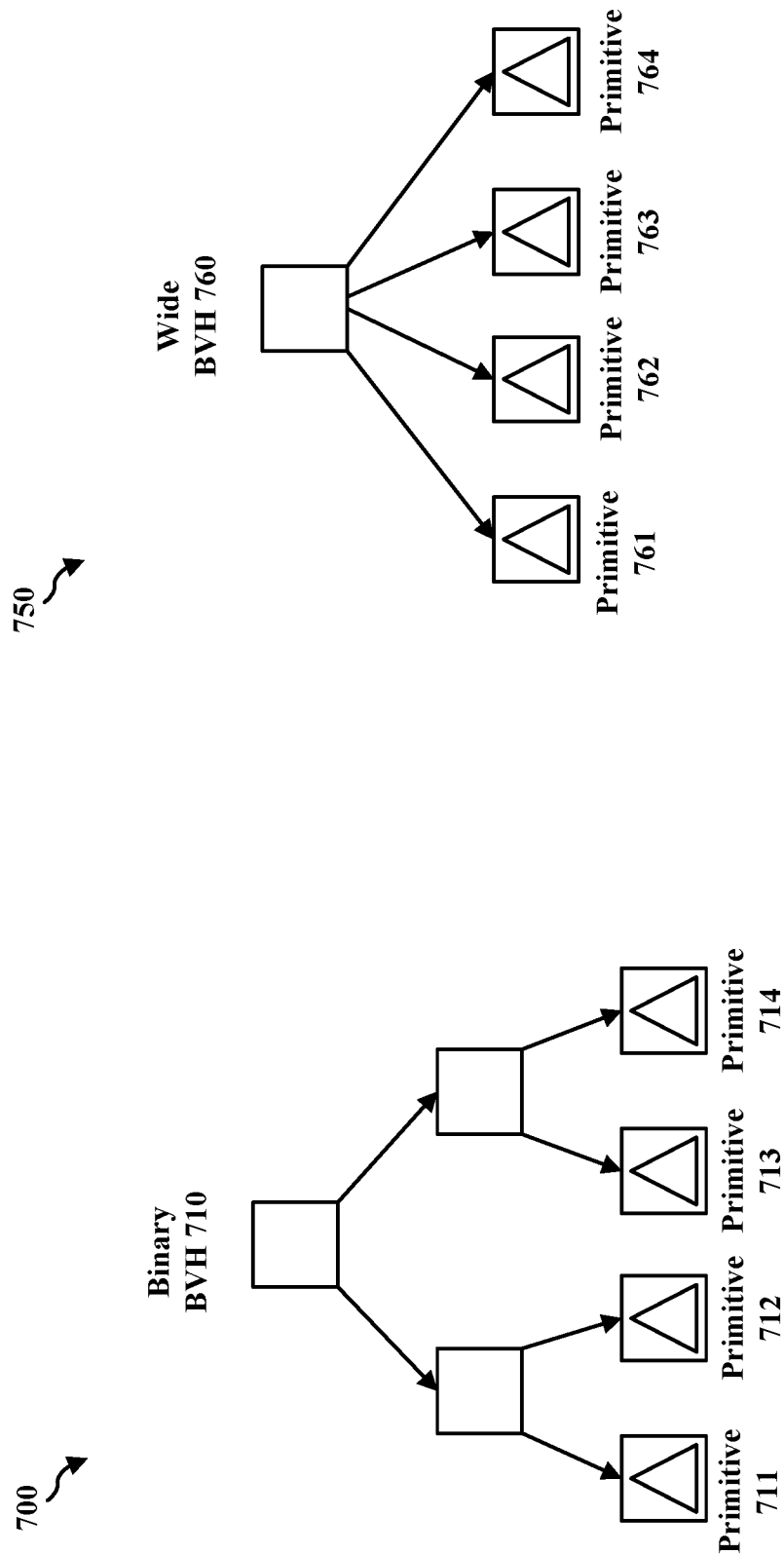
FIG. 7A is a diagram illustrating an example bounding volume hierarchy.
FIG. 7B is a diagram illustrating an example bounding volume hierarchy.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages (e.g., a BVH construction stage and a BVH node compression stage), a driver may construct the BVH on a CPU or GPU. In a BVH traversal stage, the BVH traversal may occur in the shader at the GPU. Also, certain stages (e.g., a BVH node decompression stage, a ray-bounding box intersection stage, and a ray-triangle intersection stage) may be implemented within GPU hardware.

Figure 8:
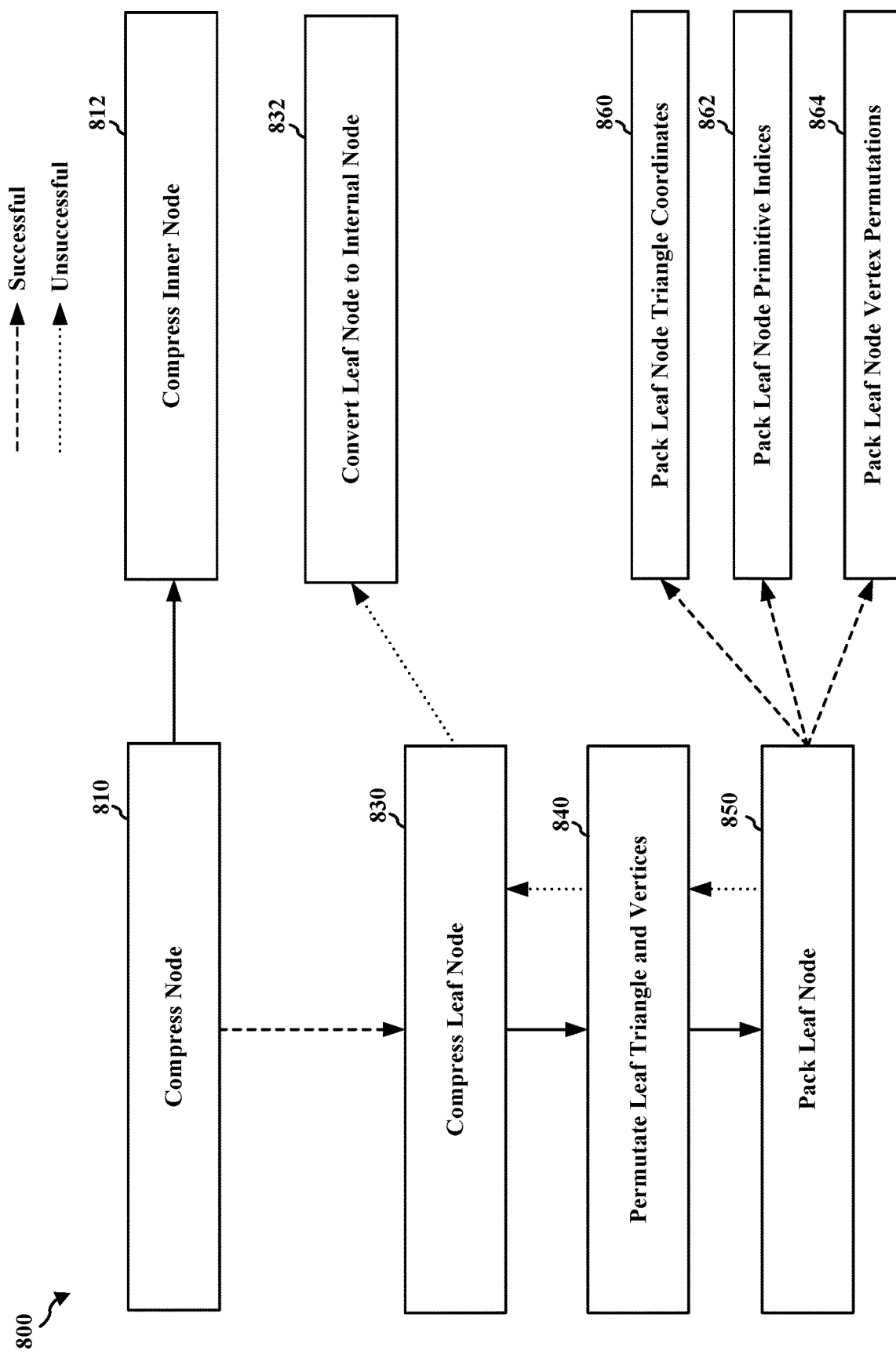
FIG. 8 is a diagram illustrating an example ray tracing call flow.

FIG. 8 illustrates diagram 800 including one example of a call flow for ray tracing. As shown in FIG. 8, diagram 800 includes a number of steps (e.g., steps 810, 812, 830, 832, 840, 850, 860, 862, and 864) of a compression node call flow that is utilized for ray tracing procedures. At step 810, the ray tracing procedure may compress at least one node. At step 812, the compression of the node may include a compression of at least one inner node. If the node compression at step 810 is successful, at step 830, the ray tracing procedure may compress at least one leaf node. If the leaf node compression at step 830 is unsuccessful (i.e., the compressibility cannot be predicted or the size after compression is larger than a target size), at step 832, the ray tracing procedure may convert the leaf node to an internal node, e.g., by subdividing the leaf node. At step 840, the ray tracing procedure may permutate or rearrange at least one leaf primitive/triangle (e.g., the layout of the primitive is rearranged) and one or more vertices (e.g., the order of the vertices may be rearranged). If the permutation at step 840 is unsuccessful (e.g., the primitive or vertices cannot be rearranged), the ray tracing procedure may repeat step 830. At step 850, the ray tracing procedure may pack or store at least one leaf node. If the packing at step 850 is unsuccessful (e.g., there is insufficient size to store the node), the ray tracing procedure may repeat step 840. If the packing at step 850 is successful, the ray tracing procedure may perform steps 860, 862, and 864. At step 860, the ray tracing procedure may pack or store one or more leaf node primitive coordinate values, such as triangle coordinate values. At step 862, the ray tracing procedure may pack or store one or more leaf node primitive indices. At step 864, the ray tracing procedure may pack or store one or more leaf node vertex permutations. In some instances, the steps performed in the compression node call flow of FIG. 8 may not sufficiently reduce the compression time without compromising ray tracing performance.

In order to improve ray tracing performance, primitive data (i.e., geometric data for primitives such as coordinate values of vertices of the primitive and/or one or more primitive indices, or the like) may be stored in certain nodes. For example, primitive data may be directly stored in leaf nodes in fixed size blocks that are equal in size to a cache line. By doing so, a GPU may be able to fetch a cache line and access it efficiently. For certain types of GPUs, an amount of primitives/triangles (e.g., up to 4 primitives/triangles) may be stored in a leaf node of a certain size (e.g., 64 bytes). One challenge may be to fit a certain amount of data for a certain amount of primitives/triangles (e.g., 144 bytes=4 triangles*3 vertices*3 components*4 bytes per component) into a memory of a smaller size (e.g., a memory of less than 64 bytes).

Some types of compression algorithms may compress data for a node including one or more primitives, such as triangles. In some aspects, a compression algorithm may identify a node anchor, e.g., a primitive and/or vertex to determine an anchor position. In addition to storing the node anchor, one or more vertex positions included in the node may be stored as offsets. In other words, the compression algorithm may store node anchors and differences to compress data. When doing so, a number of permutations with respect to the involved primitives and/or vertices may be attempted in order to determine a combination where the data may fit into a specified size, also referred to as a target size. For example, if four primitives/triangles of a leaf node are placed in any order and the vertices are in any order, this may result in 6144 possibilities (i.e., $(4!)*(4)^4=6144$ possibilities). In some instances of ray tracing, while attempting different combinations, a certain combination may be discovered that can be compressed (i.e., compressed to fit a target size such as the above mentioned 64 bytes). However, when data cannot be compressed into the specified size, every combination may be attempted in order to determine that the data is not compressible. This process consumes a lot of cycles that exhaust all the combinations and may result in no useful output. In some instances, less than half of the nodes may be compressible. Failing this number of nodes (e.g., 50% of nodes) may take a large amount of time compared to solely processing compressed nodes. Further, it may not be possible to perform the compression in real time to attempt all the permutations within the allocated ray tracing frame time. For example, a model of 252,000 primitives may take around 16 seconds on a single thread. As such, it is desirable to significantly reduce the compression time (e.g., reduce the time to the order of milliseconds). One solution is to pack fewer primitives/triangles in the leaf node, which takes a lot less time to compress due to fewer combinations. However, ray tracing performance may be compromised by packing fewer primitives/triangles in the leaf node. Based on the above, it may be beneficial to reduce the amount of compression time for ray tracing procedures without compromising performance.

Aspects of the present disclosure may reduce the amount of compression time for ray tracing procedures without compromising ray tracing performance. For instance, aspects of the present disclosure may reduce the amount of compression time while maintaining to pack/store a desirable amount of primitives/triangles in a leaf node, such that ray tracing performance is not compromised. In order to do so, aspects of the present disclosure may introduce a prediction function before a compression stage. The prediction function according to aspects presented herein may predict the leaf node compressibility in order to filter out most of the non-compressible nodes. Aspects presented herein may also predict the leaf node compressibility without eliminating any compressible nodes. Additionally, the prediction functions according to aspects presented herein may not return any inaccuracies (e.g., false negatives) regarding the compressibility of nodes.

Figure 9:
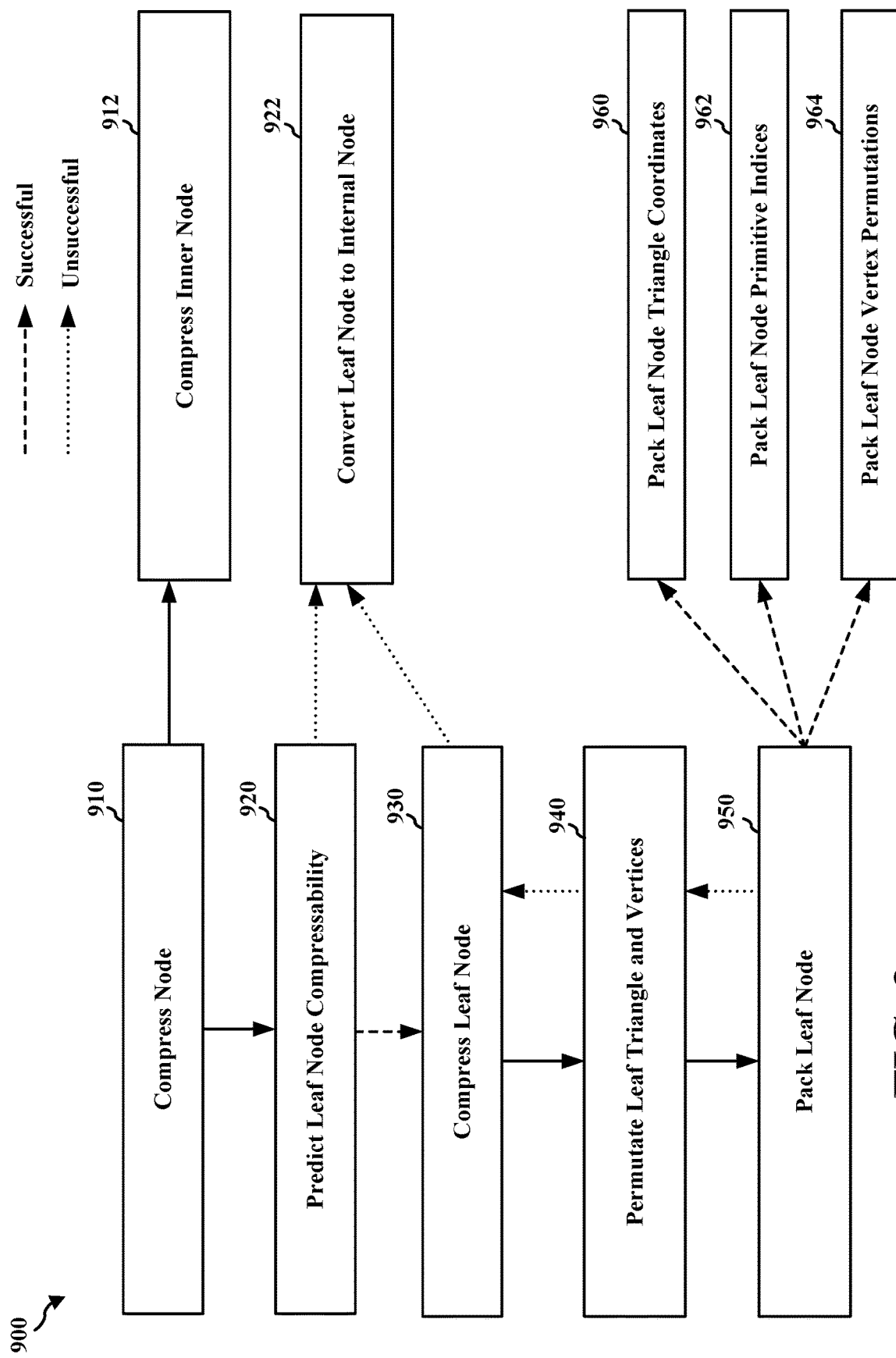
FIG. 9 is a diagram illustrating an example ray tracing call flow.

FIG. 9 illustrates diagram 900 including one example of a call flow for a ray tracing procedure according to aspects of the present disclosure. As shown in FIG. 9, diagram 900 includes a number of steps (e.g., steps 910, 912, 920, 922, 930, 940, 950, 960, 962, and 964) of a compression node call flow for ray tracing procedures. At step 910 in FIG. 9, the ray tracing procedure may compress at least one node (i.e., compress data of one or more primitives such as triangles included in the respective node). At step 912, the compression of the node may include a compression of at least one inner node. At step 920, the ray tracing procedure may predict the compressibility of at least one leaf node (that is, predict/estimate whether the node is compressible, i.e., whether the data of the one or more primitives included in the node can be compressed to a size at or below a target size). If the compressibility prediction at step 920 is unsuccessful (i.e., the compressibility cannot be predicted or the size after compression is larger than a target size), at step 922, the ray tracing procedure may convert the leaf node to an internal node. If the compressibility prediction at step 920 is successful (i.e., resulting in a prediction that the leaf node is compressible), at step 930, the ray tracing procedure may compress the at least one leaf node. If the compression at step 930 is unsuccessful, the ray tracing procedure may perform the leaf node-to-internal node conversion at step 922. At step 940 in FIG. 9, the ray tracing procedure may permutate or rearrange at least one primitive and one or more vertices. If the permutation at step 940 is unsuccessful (i.e., the primitive or vertices were unable to be rearranged), the ray tracing procedure may repeat step 930. At step 950, the ray tracing procedure may pack or store at least one leaf node. If the packing at step 950 is unsuccessful, the ray tracing procedure may repeat step 940. If the packing at step 950 is successful (i.e., there was insufficient storage space for the leaf node), the ray tracing procedure may perform steps 960, 962, and 964. At step 960, the ray tracing procedure may pack or store one or more leaf node primitive/triangle coordinate values. At step 962, the ray tracing procedure may pack or store one or more leaf node primitive indices. At step 964, the ray tracing procedure may pack or store one or more leaf node vertex permutations. As indicated herein, the steps performed in the compression node call flow of FIG. 9 may sufficiently reduce the compression time without compromising any ray tracing performance.

FIG. 9 depicts a compression node call flow according to aspects of the present disclosure including a prediction function to predict a compressibility of leaf nodes in ray tracing. The prediction function in FIG. 9 may determine a node compressibility without attempting to perform every node combination (i.e., permutations or arrangements of the primitives and/or their vertices within a node) based on identified factors of a compression algorithm. This prediction function may take a constant and negligible amount of time compared to attempting all possible node permutations. In some instances, after performing the prediction function in FIG. 9, most of the non-compressible nodes may be thrown out without attempting any combinations. Additionally, after performing the prediction function in FIG. 9, whichever nodes are predicted to be compressible may be passed on to the actual compression stage.

Figure 10:
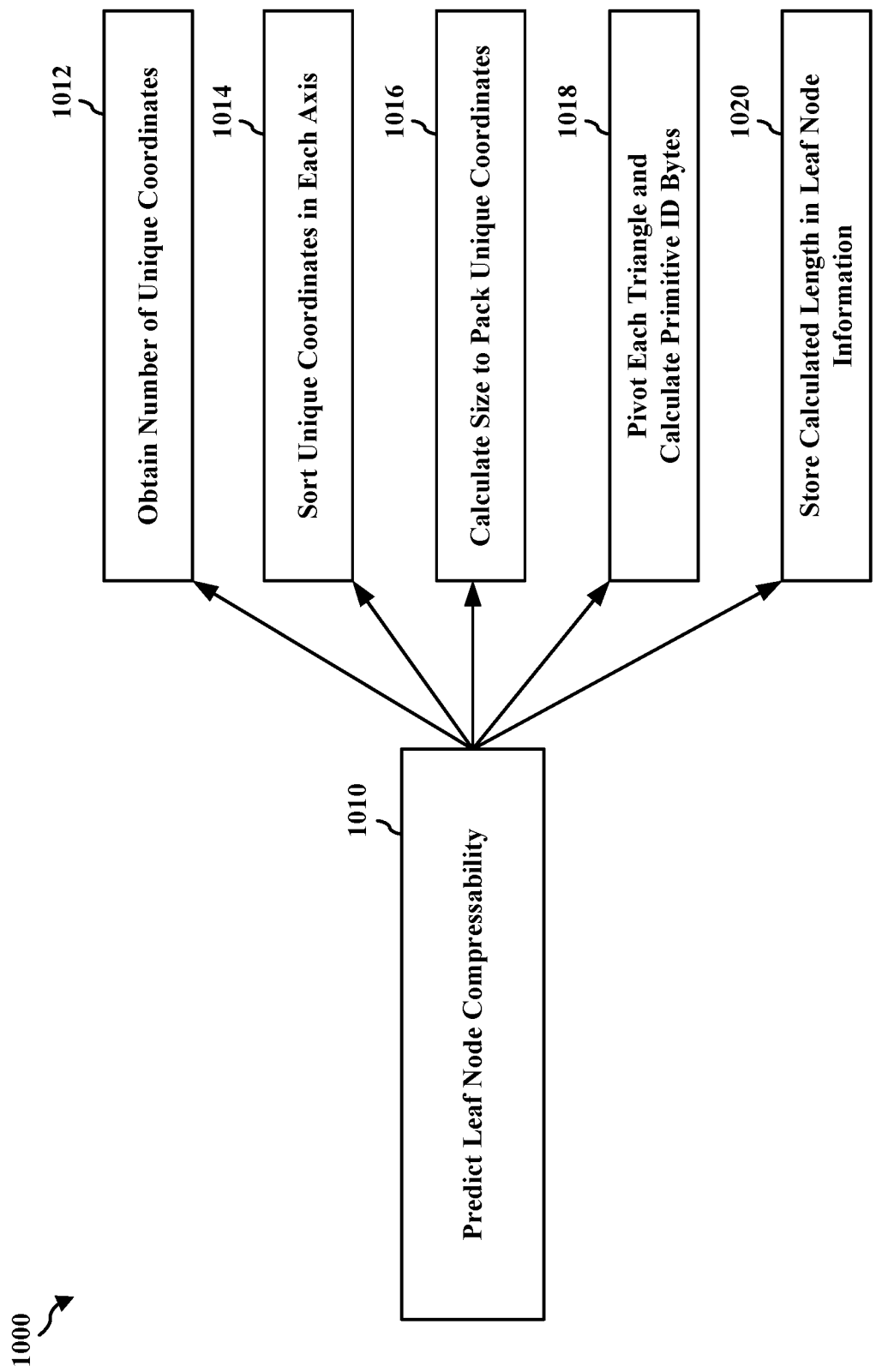
FIG. 10 is a diagram illustrating an example ray tracing call flow.

FIG. 10 illustrates diagram 1000 including example steps of a compression node call flow for a ray tracing procedure according to aspects of the present disclosure. As shown in FIG. 10, diagram 1000 includes a number of steps (e.g., steps 1010, 1012, 1014, 1016, 1018, and 1020) of a compression node call flow that is utilized for ray tracing procedures. At step 1010, the ray tracing procedure may predict the compressibility of at least one leaf node (i.e., predict/estimate whether the node is compressible). In order to predict the compressibility of the node, the ray tracing procedure may perform one or more of steps 1012, 1014, 1016, 1018, and 1020. At step 1012, to predict the compressibility of the node, the ray tracing procedure may obtain a number of unique coordinates of the node. For example, coordinates of the node may refer to the coordinates of vertices of primitives/triangles in the node. Also, the number of unique coordinates may refer to the number of coordinates having unique values. At step 1014, to predict the compressibility of the node, the ray tracing procedure may sort a number of unique coordinates of the node (e.g., unique coordinates for each axis of the node). At step 1016, to predict the compressibility of the node, the ray tracing procedure may calculate a size to pack or store the unique coordinates of the node. For example, storage size of the unique coordinates may be determined based on the amount of unique coordinates. At step 1018, to predict the compressibility of the node, the ray tracing procedure may adjust or pivot each primitive/triangle and calculate a number of primitive identifier (ID) bytes. For example, the primitive may be adjusted based on its location, and the number of primitive ID bytes may be calculated based on the size or identity of the primitive. At step 1020, to predict the compressibility of the node, the ray tracing procedure may store calculated data (e.g., the size of the node coordinates, such as the coordinate length) in leaf node information.

FIG. 10 shows some details of the leaf node compressibility prediction function, which may be similar to the leaf node compressibility prediction function in FIG. 9. For instance, predicting the compressibility of at least one leaf node at step 1010 in FIG. 10 may correspond to step 920 in FIG. 9. Additionally, the prediction function in FIG. 10 may utilize a number of factors to predict or estimate the leaf node compressibility. For example, the prediction function in FIG. 10 may utilize unique coordinate values, a minimal difference between adjacent coordinate values (e.g., a minimal difference between adjacent coordinate values with respect to a specific coordinate axis), as well as other factors that may be determined in constant time. In some instances, the ray tracing procedure may determine that the sum of twice the number of unique coordinates and a minimum number of primitive ID bytes is greater than a calculated length for the unique coordinates. Also, the ray tracing procedure may determine a sum of a minimum coordinate length in each coordinate axis and a minimum primitive ID length. The ray tracing procedure may also determine that a primitive ID or primitive ID length is outside of a certain threshold (e.g., a threshold of 24 bits). Further, the ray tracing procedure may determine that a number of adjacent coordinate values are outside of a certain threshold (e.g., a threshold of 24 bits), such as by calculating a difference between adjacent coordinate values.

Figure 11:
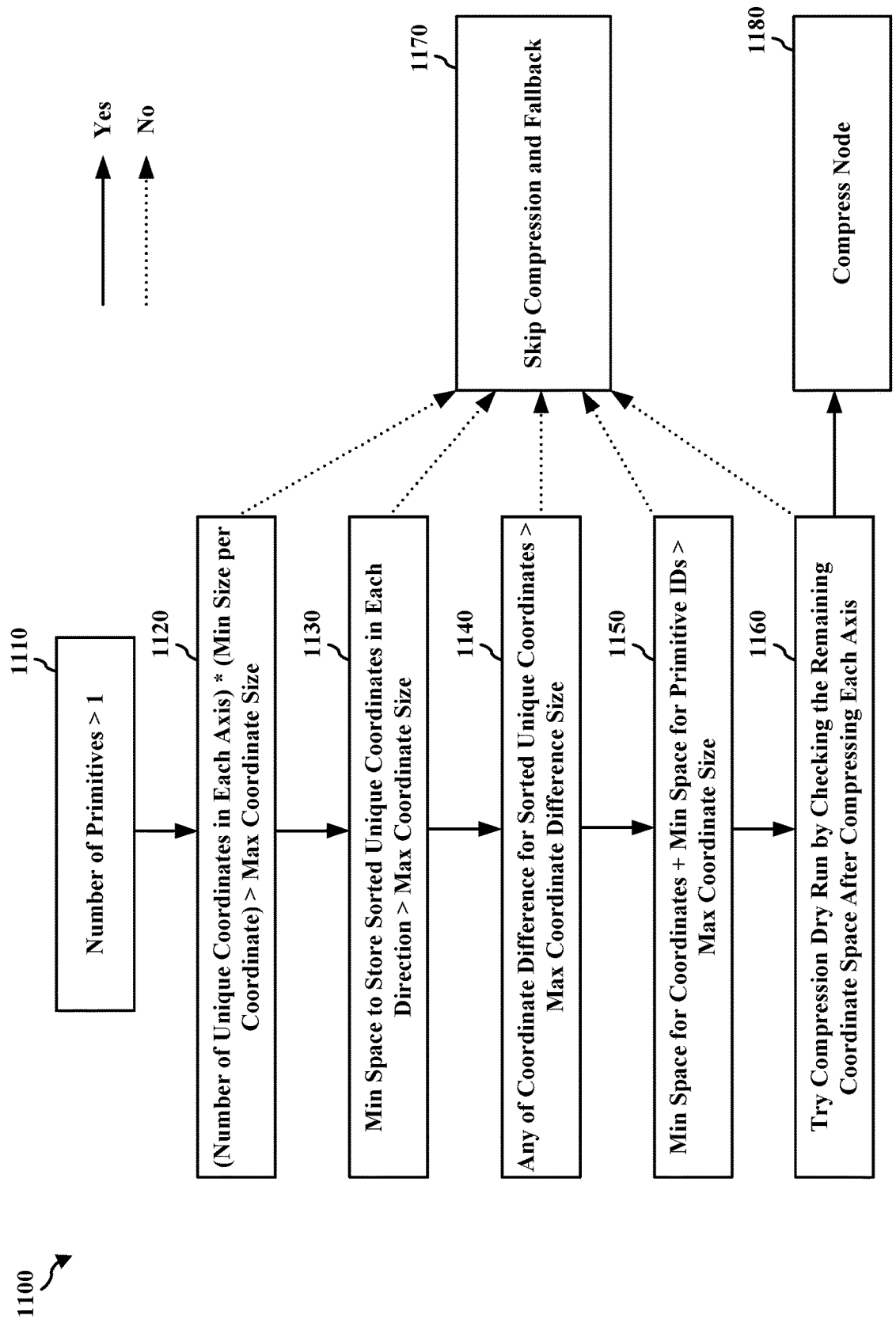
FIG. 11 is a diagram illustrating an example ray tracing call flow.

FIG. 11 illustrates diagram 1100 including example steps of a compression node call flow for a ray tracing procedure according to aspects of the present disclosure. As shown in FIG. 11, diagram 1100 includes a number of steps (e.g., steps 1110, 1120, 1130, 1140, 1150, 1160, 1170, and 1180) of a compression node call flow for ray tracing procedures. At step 1110, the ray tracing procedure may determine whether a number of primitives in a node (e.g., a leaf node) is greater than one. If the number of primitives in the node is determined to be greater than one at step 1110, the ray tracing procedure may proceed to step 1120. At step 1120, the ray tracing procedure may determine whether a product of a number of unique coordinates of the node (e.g., coordinate values in each axis of the node) and a minimum size per coordinate of the node is greater than a maximum coordinate size of the node (e.g., the available size of the cache or cache line to store the node). In some instances, the minimum size per coordinate of the node and the maximum coordinate size of the node may be determined based on a node coordinate storage calculation. If the product of the number of unique coordinates of the node and the minimum size per coordinate of the node is greater than the maximum coordinate size of the node, the ray tracing procedure may proceed to step 1130; otherwise, the ray tracing procedure may skip the compression and fallback at step 1170 (i.e., the procedure estimates that the node is not compressible). At step 1130, the ray tracing procedure may determine whether a minimum size to store sorted unique coordinates (e.g., coordinate values in each direction) is greater than a maximum coordinate size of the node. If yes, the ray tracing procedure may proceed to step 1140; otherwise, the ray tracing procedure may skip the compression and fallback at step 1170. At step 1140, the ray tracing procedure may determine whether a size difference between at least two of the sorted unique coordinates is greater than a maximum coordinate difference size of the node (e.g., the difference between the minimum coordinate size and the maximum coordinate size of the node). If yes, the ray tracing procedure may proceed to step 1150; otherwise, the ray tracing procedure may skip the compression and fallback at step 1170. At step 1150, the ray tracing procedure may determine whether a sum of a minimum space/storage size for coordinates of the node and a minimum space/size for primitive identifiers (IDs) of the node is greater than the maximum coordinate size of the node. If yes, the ray tracing procedure may proceed to step 1160; otherwise, the ray tracing procedure may skip the compression and fallback at step 1170. At step 1160, the ray tracing procedure may perform a dry compression run (i.e., an initial compression) by detecting an available size of remaining coordinate space of the unique coordinates (e.g., the remaining storage space to store coordinates) after compressing each axis of the unique coordinate values. If the available size of remaining coordinate space is sufficient for the compressed unique coordinates, the ray tracing procedure may proceed to compress the node at step 1180; otherwise, the ray tracing procedure may skip the compression and fallback at step 1170. In some instances, the node may be compressed if the available size of the remaining coordinate space is greater than a size threshold, and the node may not be compressed if the available size of the remaining coordinate space is less than or equal to the size threshold. It is to be noted that each of the step described above with reference to FIG. 11 may be performed in any order or sequence, as well as in parallel.

FIG. 11 shows some details of the leaf node compressibility prediction function, such as the leaf node compressibility prediction function in FIGS. 9 and 10. For instance, the compression node call flow in FIG. 11 may correspond to predicting the compressibility of at least one leaf node at step 920 in FIG. 9. Further, the compression node call flow in FIG. 11 may correspond to predicting the compressibility of at least one leaf node at step 1010 in FIG. 10. As indicated herein, the prediction function in FIG. 11 may determine the node compressibility without attempting every possible combination of node compressibility. The steps performed in the compression node call flow of FIG. 11 may take a constant and negligible amount of time compared to attempting all possible node compression iterations.

In some aspects, determining the compressibility of non-compressible nodes may consume more time than determining the compressibility of compressible nodes. Aspects of the present disclosure may filter out most of the non-compressible nodes in a fixed time without attempting all the possible permutations, which may help to compress nodes within a time period suitable for ray tracing (e.g., a few milliseconds). In some instances, the prediction function utilized in aspects of the present disclosure may filter out a certain amount of non-compressible nodes (e.g., more than 95% of the non-compressible nodes). Additionally, the prediction function utilized in aspects of the present disclosure may reduce the amount of time necessary to perform the compression by a certain amount (e.g., reduce the amount of time by more than 95%). Moreover, applying the prediction function of the present disclosure to certain components within a CPU or GPU (e.g., a GPU shader) may reduce the node compression time (e.g., reduce the compression time to a few milliseconds).

Aspects of the present disclosure may include a number of benefits or advantages.

For instance, aspects of the present disclosure may reduce the amount of compression time for ray tracing procedures without compromising ray tracing performance. For example, aspects of the present disclosure may reduce the amount of compression time while maintaining to pack a desirable amount of primitives/triangles in a leaf node, such that ray tracing performance is not compromised in any manner. The prediction function of aspects presented herein may predict the leaf node compressibility in order to filter out most of the non-compressible nodes, such that the prediction function may not need to process these non-compressible nodes, thus saving time and processing power. Additionally, the prediction functions according to aspects presented herein may return accurate results of the compressibility of nodes, such as by not returning any inaccuracies (e.g., false negatives) regarding the node compressibility.

Figure 12:
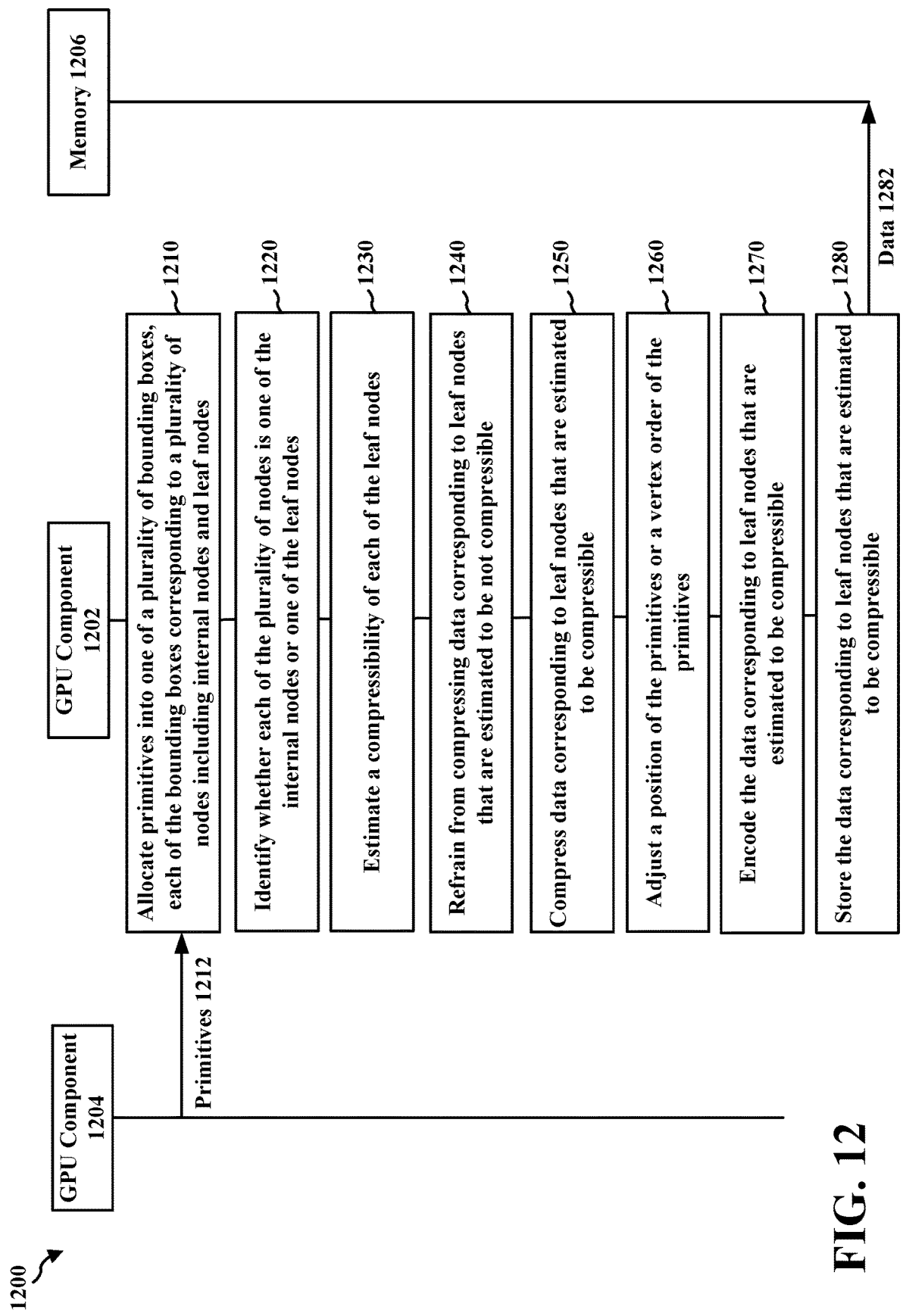
FIG. 12 is a communication flow diagram illustrating example communications between GPU components.

FIG. 12 is a communication flow diagram 1200 of graphics processing in accordance with one or more techniques of this disclosure. As shown in FIG. 12, diagram 1200 includes example communications between components of a GPU (or other graphics processor), e.g., GPU component 1202, GPU component 1204, and memory 1206, in accordance with one or more techniques of this disclosure.

At 1210, GPU component 1202 may allocate each of a plurality of primitives in a scene (e.g., primitives 1212) into one of a plurality of bounding boxes, each of the plurality of primitives including one or more vertices, each of the plurality of bounding boxes corresponding to a plurality of nodes including one or more internal nodes and one or more leaf nodes. The plurality of nodes may be associated with a binary tree bounding volume hierarchy (BVH), such that the one or more leaf nodes are child nodes for at least one of the one or more internal nodes. The plurality of bounding boxes may be a plurality of axis-aligned bounding boxes (AABBs).

At 1220, GPU component 1202 may identify whether each of the plurality of nodes is one of the one or more internal nodes or one of the one or more leaf nodes.

At 1230, GPU component 1202 may estimate a compressibility of each of the one or more leaf nodes, the compressibility of each leaf node corresponding to whether the leaf node is compressible.

In some aspects, GPU component 1202 may identify a number of a plurality of unique coordinates of the node. For instance, estimating the compressibility of each of the one or more leaf nodes may include identifying a number of a plurality of unique coordinates of the leaf node. Also, GPU component 1202 may sort the plurality of unique coordinates of the leaf node. For instance, estimating the compressibility of each of the one or more leaf nodes may further include sorting the plurality of unique coordinates of the leaf node. In some instances, the compressibility of the node may correspond to whether data associated with the node is compressible to fit a target storage size (i.e., a remaining storage size) or a target cache size (i.e., a remaining cache size). Further, GPU component 1202 may calculate a size of the plurality of unique coordinates of the leaf node for storage. For instance, estimating the compressibility of each of the one or more leaf nodes further includes calculating a size of the plurality of unique coordinates of the leaf node for storage. GPU component 1202 may also store the plurality of unique coordinates based on the calculated size, where the plurality of unique coordinates is stored as leaf node information. For instance, estimating the compressibility of each of the one or more leaf nodes may further include storing the plurality of unique coordinates based on the calculated size, where the plurality of unique coordinates is stored as leaf node information. GPU component 1202 may also adjust a number of primitives associated with the leaf node; and calculate a number of primitive identifier (ID) bytes for the leaf node. For instance, estimating the compressibility of each of the one or more leaf nodes may include adjusting a number of primitives associated with the leaf node; and calculating a number of primitive identifier (ID) bytes for the leaf node.

In some instances, the compressibility of each of the one or more leaf nodes may be estimated if a number of primitives associated with the leaf node is greater than 1. GPU component 1202 may identify whether a product of a number of a plurality of unique coordinates of the leaf node and a minimum size per coordinate of the leaf node is greater than a maximum coordinate size of the leaf node. For instance, estimating the compressibility of each of the one or more leaf nodes may include identifying whether a product of a number of a plurality of unique coordinates of the leaf node and a minimum size per coordinate of the leaf node is greater than a maximum coordinate size of the leaf node. GPU component 1202 may also identify whether a minimum size to store the plurality of unique coordinates is greater than the maximum coordinate size of the leaf node. For instance, estimating the compressibility of each of the one or more leaf nodes may further include identifying whether a minimum size to store the plurality of unique coordinates is greater than the maximum coordinate size of the leaf node. GPU component 1202 may also identify whether a size difference between at least two of the plurality of unique coordinates is greater than a maximum coordinate difference size of the leaf node. For instance, estimating the compressibility of each of the one or more leaf nodes may further include identifying whether a size difference between at least two of the plurality of unique coordinates is greater than a maximum coordinate difference size of the leaf node. GPU component 1202 may also identify whether a sum of the minimum size per coordinate of the leaf node and a minimum size of primitive identifiers (IDs) of the leaf node is greater than the maximum coordinate size of the leaf node. For instance, estimating the compressibility of each of the one or more leaf nodes may further include identifying whether a sum of the minimum size per coordinate of the leaf node and a minimum size of primitive identifiers (IDs) of the leaf node is greater than the maximum coordinate size of the leaf node. GPU component 1202 may also detect an available size of remaining coordinate space of the plurality of unique coordinates in the leaf node for a compression of the plurality of unique coordinates. For instance, estimating the compressibility of each of the one or more leaf nodes may further include detecting an available size of remaining coordinate space of the plurality of unique coordinates in the leaf node for a compression of the plurality of unique coordinates. In some instances, the data corresponding to each of the one or more leaf nodes may be compressed if the available size of the remaining coordinate space is greater than a size threshold. Also, the data corresponding to each of the one or more leaf nodes may not be compressed if the available size of the remaining coordinate space is less than or equal to the size threshold.

At 1240, GPU component 1202 may refrain from compressing data corresponding to each of the one or more leaf nodes if the leaf node is estimated to be not compressible. At 1250, GPU component 1202 may compress data corresponding to each of the one or more leaf nodes if the leaf node is estimated to be compressible. The compression of the data corresponding to each of the one or more leaf nodes may be associated with a ray tracing procedure. In some instances, estimating the compressibility of each of the one or more leaf nodes may identify a configuration for storage of the data corresponding to each of the one or more leaf nodes. In some aspects, the configuration for storage of the data corresponding to each of the one or more leaf nodes may be determined based on an available storage size for the compressed data. Also, the data corresponding to each of the one or more leaf nodes may not be compressed if the node is estimated to be not compressible.

At 1260, GPU component 1202 may adjust at least one of a position of the plurality of primitives or a vertex order of the plurality of primitives upon compressing the data corresponding to each of the one or more leaf nodes.

At 1270, GPU component 1202 may encode the data corresponding to each of the one or more leaf nodes that is estimated to be compressible prior to storing the data corresponding to the leaf node, such that the data corresponding to the leaf node is stored in an encoded format.

At 1280, GPU component 1202 may store the data corresponding to each of the one or more leaf nodes (e.g., store data 1282 in memory 1206) that is estimated to be compressible. The data corresponding to each of the one or more leaf nodes may include at least one of: one or more primitive coordinates of the leaf node, one or more primitive identifiers (IDs) of the leaf node, or at least one vertex permutation of the leaf node.

Figure 13:
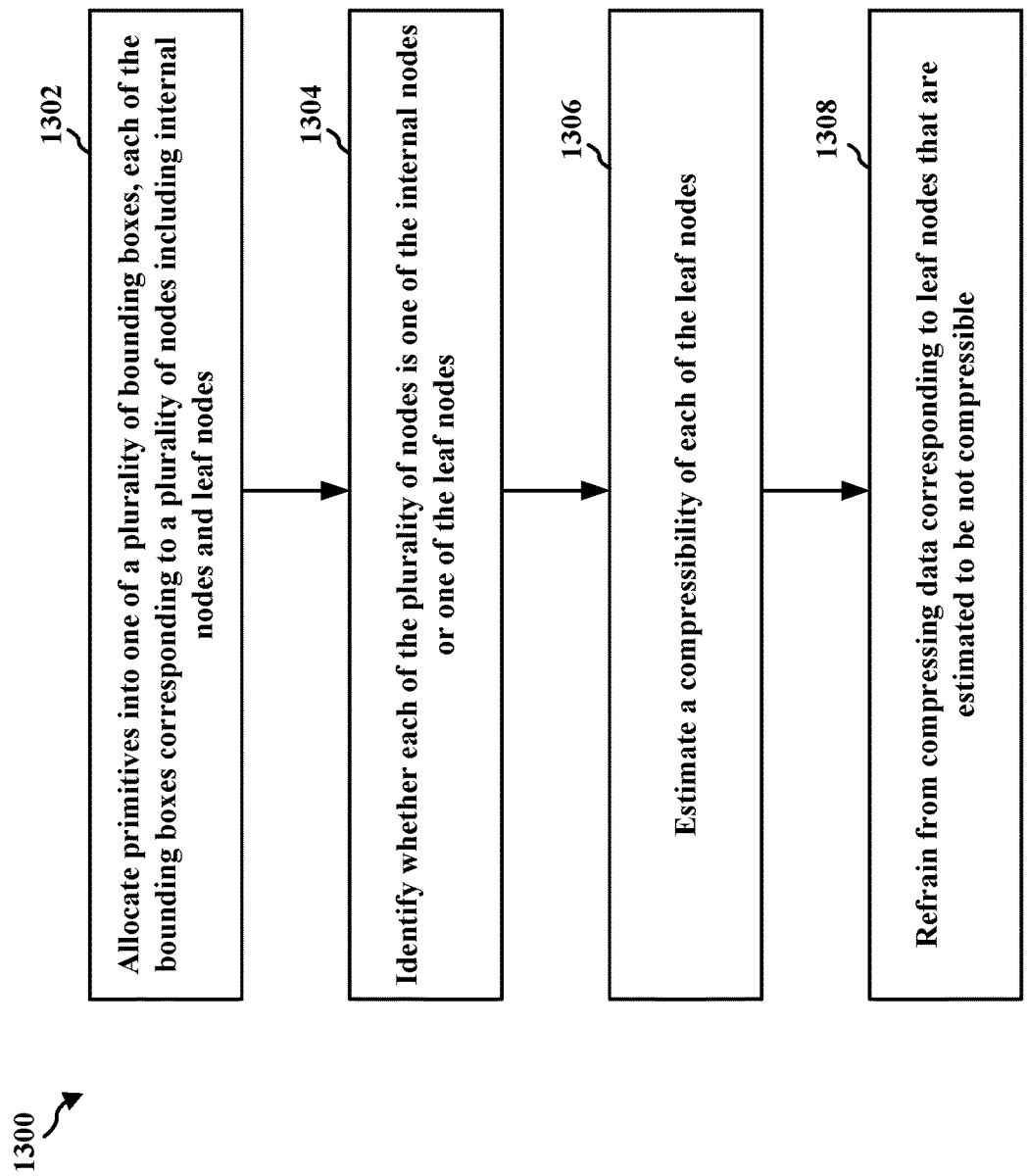
FIG. 13 is a flowchart of an example method of graphics processing.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1302, the GPU may allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes, as described in connection with the examples in FIGS. 1-12. For example, as described in 1210 of FIG. 12, GPU component 1202 may allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes. Further, step 1302 may be performed by processing unit 120 in FIG. 1. The plurality of nodes may be associated with a binary tree bounding volume hierarchy (BVH), such that the one or more leaf nodes are child nodes for at least one of the one or more internal nodes. The plurality of bounding boxes may be a plurality of axis-aligned bounding boxes (AABBs).

At 1304, the GPU may identify whether each of the plurality of nodes is one of the one or more internal nodes or one of the one or more leaf nodes, as described in connection with the examples in FIGS. 1-12. For example, as described in 1220 of FIG. 12, GPU component 1202 may identify whether each of the plurality of nodes is one of the one or more internal nodes or one of the one or more leaf nodes. Further, step 1304 may be performed by processing unit 120 in FIG. 1.

At 1306, the GPU may estimate a compressibility of each of the one or more leaf nodes, the compressibility of each leaf node corresponding to whether the leaf node is compressible, as described in connection with the examples in FIGS. 1-12. For example, as described in 1230 of FIG. 12, GPU component 1202 may estimate a compressibility of each of the plurality of nodes if the node is one of the one or more leaf nodes, the compressibility of the node corresponding to whether the node is compressible. Further, step 1306 may be performed by processing unit 120 in FIG. 1.

In some aspects, the GPU may identify a number of a plurality of unique coordinates of the node. For instance, estimating the compressibility of each of the one or more leaf nodes may include identifying a number of a plurality of unique coordinates of the leaf node. Also, the GPU may sort the plurality of unique coordinates of the leaf node. For instance, estimating the compressibility of each of the one or more leaf nodes may further include sorting the plurality of unique coordinates of the leaf node. Further, the GPU may calculate a size of the plurality of unique coordinates of the leaf node for storage. For instance, estimating the compressibility of each of the one or more leaf nodes further includes calculating a size of the plurality of unique coordinates of the leaf node for storage. The GPU may also store the plurality of unique coordinates based on the calculated size, where the plurality of unique coordinates is stored as leaf node information. For instance, estimating the compressibility of each of the one or more leaf nodes may further include storing the plurality of unique coordinates based on the calculated size, where the plurality of unique coordinates is stored as leaf node information. The GPU may also adjust a number of primitives associated with the leaf node; and calculate a number of primitive identifier (ID) bytes for the leaf node. For instance, estimating the compressibility of each of the one or more leaf nodes may include adjusting a number of primitives associated with the leaf node; and calculating a number of primitive identifier (ID) bytes for the leaf node.

In some instances, the compressibility of each of the one or more leaf nodes may be estimated if a number of primitives associated with the leaf node is greater than 1. The GPU may identify whether a product of a number of a plurality of unique coordinates of the leaf node and a minimum size per coordinate of the leaf node is greater than a maximum coordinate size of the leaf node. For instance, estimating the compressibility of each of the one or more leaf nodes may include identifying whether a product of a number of a plurality of unique coordinates of the leaf node and a minimum size per coordinate of the leaf node is greater than a maximum coordinate size of the leaf node. The GPU may also identify whether a minimum size to store the plurality of unique coordinates is greater than the maximum coordinate size of the leaf node. For instance, estimating the compressibility of each of the one or more leaf nodes may further include identifying whether a minimum size to store the plurality of unique coordinates is greater than the maximum coordinate size of the leaf node. The GPU may also identify whether a size difference between at least two of the plurality of unique coordinates is greater than a maximum coordinate difference size of the leaf node. For instance, estimating the compressibility of each of the one or more leaf nodes may further include identifying whether a size difference between at least two of the plurality of unique coordinates is greater than a maximum coordinate difference size of the leaf node. The GPU may also identify whether a sum of the minimum size per coordinate of the leaf node and a minimum size of primitive identifiers (IDs) of the leaf node is greater than the maximum coordinate size of the leaf node. For instance, estimating the compressibility of each of the one or more leaf nodes may further include identifying whether a sum of the minimum size per coordinate of the leaf node and a minimum size of primitive identifiers (IDs) of the leaf node is greater than the maximum coordinate size of the leaf node. The GPU may also detect an available size of remaining coordinate space of the plurality of unique coordinates in the leaf node for a compression of the plurality of unique coordinates. For instance, estimating the compressibility of each of the one or more leaf nodes may further include detecting an available size of remaining coordinate space of the plurality of unique coordinates in the leaf node for a compression of the plurality of unique coordinates. In some instances, the data corresponding to each of the one or more leaf nodes may be compressed if the available size of the remaining coordinate space is greater than a size threshold. Also, the data corresponding to each of the one or more leaf nodes may not be compressed if the available size of the remaining coordinate space is less than or equal to the size threshold.

At 1308, the GPU may refrain from compressing data corresponding to each of the one or more leaf nodes if the leaf node is estimated to be not compressible, as described in connection with the examples in FIGS. 1-12. For example, as described in 1240 of FIG. 12, GPU component 1202 may refrain from compressing data corresponding to each of the one or more leaf nodes if the leaf node is estimated to be not compressible. Further, step 1308 may be performed by processing unit 120 in FIG. 1. The compression of the data corresponding to each of the one or more leaf nodes may be associated with a ray tracing procedure. In some instances, estimating the compressibility of each of the one or more leaf nodes may identify a configuration for storage of the data corresponding to each of the one or more leaf nodes. Also, the data corresponding to each of the plurality of nodes may not be compressed if the node is estimated to be not compressible.

Figure 14:
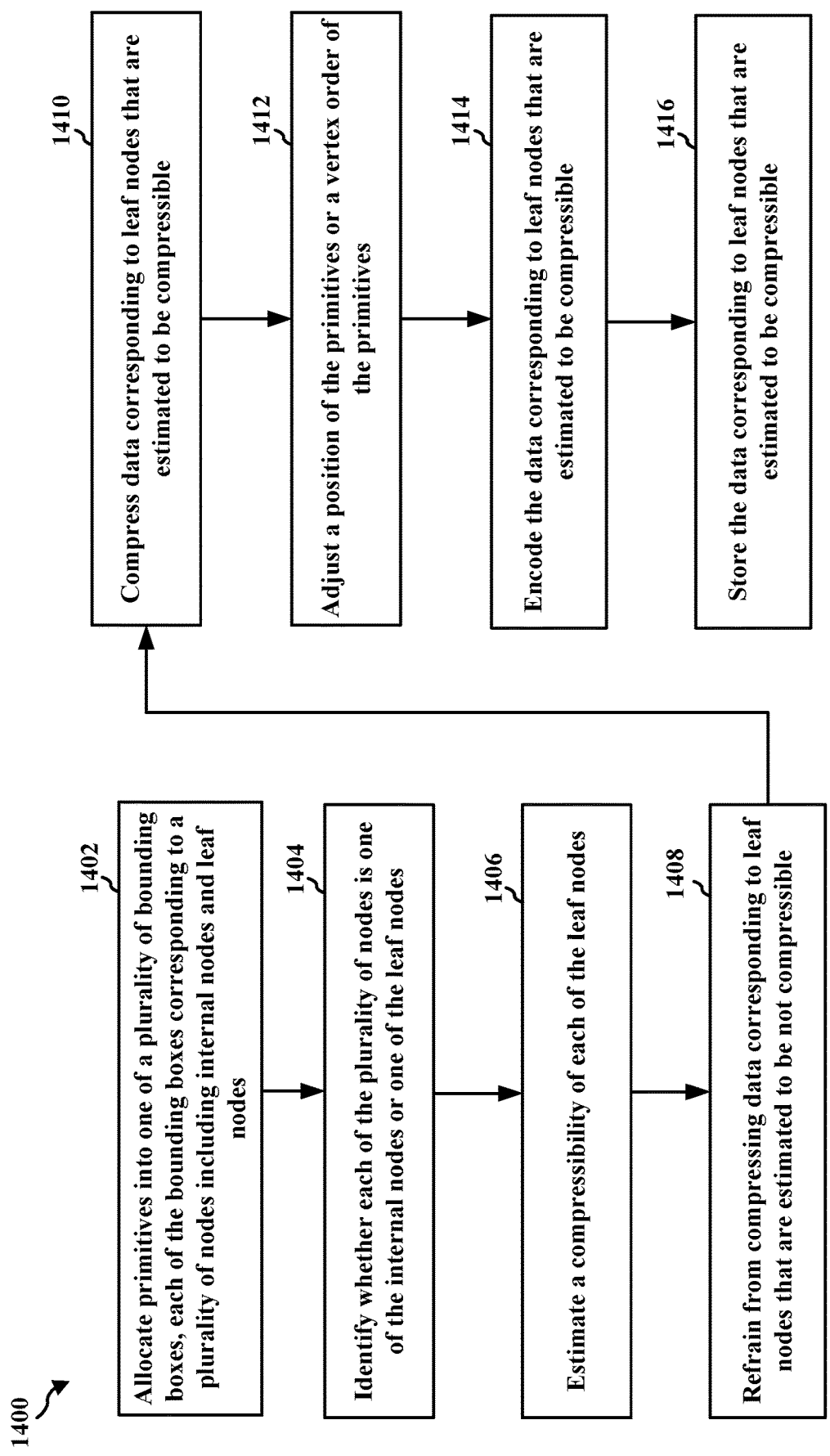
FIG. 14 is a flowchart of an example method of graphics processing.

FIG. 14 is a flowchart 1400 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1402, the GPU may allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes, as described in connection with the examples in FIGS. 1-12. For example, as described in 1210 of FIG. 12, GPU component 1202 may allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes. Further, step 1402 may be performed by processing unit 120 in FIG. 1. The plurality of nodes may be associated with a binary tree bounding volume hierarchy (BVH), such that the one or more leaf nodes are child nodes for at least one of the one or more internal nodes. The plurality of bounding boxes may be a plurality of axis-aligned bounding boxes (AABBs).

At 1404, the GPU may identify whether each of the plurality of nodes is one of the one or more internal nodes or one of the one or more leaf nodes, as described in connection with the examples in FIGS. 1-12. For example, as described in 1220 of FIG. 12, GPU component 1202 may identify whether each of the plurality of nodes is one of the one or more internal nodes or one of the one or more leaf nodes. Further, step 1404 may be performed by processing unit 120 in FIG. 1.

At 1406, the GPU may estimate a compressibility of each of the one or more leaf nodes, the compressibility of each leaf node corresponding to whether the leaf node is compressible, as described in connection with the examples in FIGS. 1-12. For example, as described in 1230 of FIG. 12, GPU component 1202 may estimate a compressibility of each of the one or more leaf nodes, the compressibility of each leaf node corresponding to whether the leaf node is compressible. Further, step 1406 may be performed by processing unit 120 in FIG. 1.

In some aspects, the GPU may identify a number of a plurality of unique coordinates of the node. For instance, estimating the compressibility of each of the one or more leaf nodes may include identifying a number of a plurality of unique coordinates of the leaf node. Also, the GPU may sort the plurality of unique coordinates of the leaf node. For instance, estimating the compressibility of each of the one or more leaf nodes may further include sorting the plurality of unique coordinates of the leaf node. Further, the GPU may calculate a size of the plurality of unique coordinates of the leaf node for storage. For instance, estimating the compressibility of each of the one or more leaf nodes further includes calculating a size of the plurality of unique coordinates of the leaf node for storage. The GPU may also store the plurality of unique coordinates based on the calculated size, where the plurality of unique coordinates is stored as leaf node information. For instance, estimating the compressibility of each of the one or more leaf nodes may further include storing the plurality of unique coordinates based on the calculated size, where the plurality of unique coordinates is stored as leaf node information. The GPU may also adjust a number of primitives associated with the leaf node; and calculate a number of primitive identifier (ID) bytes for the leaf node. For instance, estimating the compressibility of each of the one or more leaf nodes may include adjusting a number of primitives associated with the leaf node; and calculating a number of primitive identifier (ID) bytes for the leaf node.

In some instances, the compressibility of each of the one or more leaf nodes may be estimated if a number of primitives associated with the leaf node is greater than 1. The GPU may identify whether a product of a number of a plurality of unique coordinates of the leaf node and a minimum size per coordinate of the leaf node is greater than a maximum coordinate size of the leaf node. For instance, estimating the compressibility of each of the one or more leaf nodes may include identifying whether a product of a number of a plurality of unique coordinates of the leaf node and a minimum size per coordinate of the leaf node is greater than a maximum coordinate size of the leaf node. The GPU may also identify whether a minimum size to store the plurality of unique coordinates is greater than the maximum coordinate size of the leaf node. For instance, estimating the compressibility of each of the one or more leaf nodes may further include identifying whether a minimum size to store the plurality of unique coordinates is greater than the maximum coordinate size of the leaf node. The GPU may also identify whether a size difference between at least two of the plurality of unique coordinates is greater than a maximum coordinate difference size of the leaf node. For instance, estimating the compressibility of each of the one or more leaf nodes may further include identifying whether a size difference between at least two of the plurality of unique coordinates is greater than a maximum coordinate difference size of the leaf node. The GPU may also identify whether a sum of the minimum size per coordinate of the leaf node and a minimum size of primitive identifiers (IDs) of the leaf node is greater than the maximum coordinate size of the leaf node. For instance, estimating the compressibility of each of the one or more leaf nodes may further include identifying whether a sum of the minimum size per coordinate of the leaf node and a minimum size of primitive identifiers (IDs) of the leaf node is greater than the maximum coordinate size of the leaf node. The GPU may also detect an available size of remaining coordinate space of the plurality of unique coordinates in the leaf node for a compression of the plurality of unique coordinates. For instance, estimating the compressibility of each of the one or more leaf nodes may further include detecting an available size of remaining coordinate space of the plurality of unique coordinates in the leaf node for a compression of the plurality of unique coordinates. In some instances, the data corresponding to each of the one or more leaf nodes may be compressed if the available size of the remaining coordinate space is greater than a size threshold. Also, the data corresponding to each of the one or more leaf nodes may not be compressed if the available size of the remaining coordinate space is less than or equal to the size threshold.

At 1408, the GPU may refrain from compressing data corresponding to each of the one or more leaf nodes if the leaf node is estimated to be not compressible, as described in connection with the examples in FIGS. 1-12. For example, as described in 1240 of FIG. 12, GPU component 1202 may refrain from compressing data corresponding to each of the one or more leaf nodes if the leaf node is estimated to be not compressible. Further, step 1408 may be performed by processing unit 120 in FIG. 1. At 1410, the GPU may compress data corresponding to each of the one or more leaf nodes if the leaf node is estimated to be compressible, as described in connection with the examples in FIGS. 1-12. For example, as described in 1250 of FIG. 12, GPU component 1202 may compress data corresponding to each of the one or more leaf nodes if the leaf node is estimated to be compressible. Further, step 1410 may be performed by processing unit 120 in FIG. 1. The compression of the data corresponding to each of the one or more leaf nodes may be associated with a ray tracing procedure. In some instances, estimating the compressibility of each of the one or more leaf nodes may identify a configuration for storage of the data corresponding to each of the one or more leaf nodes. In some aspects, the configuration for storage of the data corresponding to each of the one or more leaf nodes may be determined based on an available storage size for the compressed data. Also, the data corresponding to each of the one or more leaf nodes may not be compressed if the node is estimated to be not compressible.

At 1412, the GPU may adjust at least one of a position of the plurality of primitives or a vertex order of the plurality of primitives upon compressing the data corresponding to each of the one or more leaf nodes, as described in connection with the examples in FIGS. 1-12. For example, as described in 1260 of FIG. 12, GPU component 1202 may adjust at least one of a position of the plurality of primitives or a vertex order of the plurality of primitives upon compressing the data corresponding to each of the one or more leaf nodes. Further, step 1412 may be performed by processing unit 120 in FIG. 1.

At 1414, the GPU may encode the data corresponding to each of the one or more leaf nodes that is estimated to be compressible prior to storing the data corresponding to the leaf node, such that the data corresponding to the leaf node is stored in an encoded format, as described in connection with the examples in FIGS. 1-12. For example, as described in 1270 of FIG. 12, GPU component 1202 may encode the data corresponding to each of the that is estimated to be compressible nodes that is estimated to be compressible prior to storing the data corresponding to the leaf node, such that the data corresponding to the leaf node is stored in an encoded format. Further, step 1414 may be performed by processing unit 120 in FIG. 1.

At 1416, the GPU may store the data corresponding to each of the one or more leaf nodes that is estimated to be compressible, as described in connection with the examples in FIGS. 1-12. For example, as described in 1280 of FIG. 12, GPU component 1202 may store the data corresponding to each of the one or more leaf nodes that is estimated to be compressible. Further, step 1416 may be performed by processing unit 120 in FIG. 1. The data corresponding to each of the one or more leaf nodes may include at least one of: one or more primitive coordinates of the leaf node, one or more primitive identifiers (IDs) of the leaf node, or at least one vertex permutation of the leaf node.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for allocating each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes. The apparatus, e.g., processing unit 120, may also include means for identifying whether each of the plurality of nodes is one of the one or more internal nodes or one of the one or more leaf nodes. The apparatus, e.g., processing unit 120, may also include means for estimating a compressibility of each of the one or more leaf nodes, the compressibility of each leaf node corresponding to whether the leaf node is compressible. The apparatus, e.g., processing unit 120, may also include means for refraining from compressing data corresponding to each of the one or more leaf nodes if the leaf node is estimated to be not compressible. The apparatus, e.g., processing unit 120, may also include means for compressing the data corresponding to each of the one or more leaf nodes if the leaf node is estimated to be compressible. The apparatus, e.g., processing unit 120, may also include means for storing the data corresponding to each of the one or more leaf nodes that is estimated to be compressible. The apparatus, e.g., processing unit 120, may also include means for encoding the data corresponding to each of the one or more leaf nodes that is estimated to be compressible prior to storing the data corresponding to the leaf node, such that the data corresponding to the leaf node is stored in an encoded format. The apparatus, e.g., processing unit 120, may also include means for adjusting at least one of a position of the plurality of primitives or a vertex order of the plurality of primitives upon compressing the data corresponding to each of the one or more leaf nodes.

The subject matter described herein may be implemented to realize one or more benefits or advantages. For instance, the described graphics processing techniques may be used by a GPU, a graphics processor, or some other processor that may perform graphics processing to implement the node compression techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize node compression techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes; identify whether each of the plurality of nodes is one of the one or more internal nodes or one of the one or more leaf nodes; estimate a compressibility of each of the one or more leaf nodes, the compressibility of each leaf node corresponding to whether the leaf node is compressible; and refrain from compressing data corresponding to each of the one or more leaf nodes if the leaf node is estimated to be not compressible.

Aspect 2 is the apparatus of aspect 1, where the at least one processor is further configured to: compress the data corresponding to each of the one or more leaf nodes if the leaf node is estimated to be compressible; and store the data corresponding to each of the one or more leaf nodes that is estimated to be compressible.

Aspect 3 is the apparatus of any of aspects 1 and 2, where the data corresponding to each of the one or more leaf includes at least one of: one or more primitive coordinates of the leaf node, one or more primitive identifiers (IDs) of the leaf node, or at least one vertex permutation of the leaf node.

Aspect 4 is the apparatus of any of aspects 1 to 3, where the at least one processor is further configured to: encode the data corresponding to each of the one or more leaf nodes that is estimated to be compressible prior to storing the data corresponding to the leaf node, such that the data corresponding to the leaf node is stored in an encoded format.

Aspect 5 is the apparatus of any of aspects 1 to 4, where to estimate the compressibility of each of the one or more leaf nodes, the at least one processor is configured to: identify a number of a plurality of unique coordinates of the leaf node.

Aspect 6 is the apparatus of any of aspects 1 to 5, where to estimate the compressibility of each of the one or more leaf nodes, the at least one processor is further configured to: sort the plurality of unique coordinates of the leaf node.

Aspect 7 is the apparatus of any of aspects 1 to 6, where to estimate the compressibility of each of the one or more leaf nodes, the at least one processor is further configured to: calculate a size of the plurality of unique coordinates of the leaf node for storage.

Aspect 8 is the apparatus of any of aspects 1 to 7, where to estimate the compressibility of each of the one or more leaf nodes, the at least one processor is further configured to: store the plurality of unique coordinates based on the calculated size, where the plurality of unique coordinates is stored as leaf node information.

Aspect 9 is the apparatus of any of aspects 1 to 8, where to estimate the compressibility of each of the one or more leaf nodes, the at least one processor is configured to: adjust a number of primitives associated with the leaf node; and calculate a number of primitive identifier (ID) bytes for the leaf node.

Aspect 10 is the apparatus of any of aspects 1 to 9, where the compressibility of each of the one or more leaf nodes is estimated if a number of primitives associated with the leaf node is greater than 1.

Aspect 11 is the apparatus of any of aspects 1 to 10, where to estimate the compressibility of each of the one or more leaf nodes, the at least one processor is configured to: identify whether a product of a number of a plurality of unique coordinates of the leaf node and a minimum size per coordinate of the leaf node is greater than a maximum coordinate size of the leaf node.

Aspect 12 is the apparatus of any of aspects 1 to 11, where to estimate the compressibility of each of the one or more leaf nodes, the at least one processor is further configured to: identify whether a minimum size to store the plurality of unique coordinates is greater than the maximum coordinate size of the leaf node.

Aspect 13 is the apparatus of any of aspects 1 to 12, where to estimate the compressibility of each of the one or more leaf nodes, the at least one processor is further configured to: identify whether a size difference between at least two of the plurality of unique coordinates is greater than a maximum coordinate difference size of the leaf node.

Aspect 14 is the apparatus of any of aspects 1 to 13, where to estimate the compressibility of each of the one or more leaf nodes, the at least one processor is further configured to: identify whether a sum of the minimum size per coordinate of the leaf node and a minimum size of primitive identifiers (IDs) of the leaf node is greater than the maximum coordinate size of the leaf node.

Aspect 15 is the apparatus of any of aspects 1 to 14, where to estimate the compressibility of each of the one or more leaf nodes, the at least one processor is further configured to: detect an available size of remaining coordinate space of the plurality of unique coordinates in the leaf node for a compression of the plurality of unique coordinates.

Aspect 16 is the apparatus of any of aspects 1 to 15, where the data corresponding to each of the one or more leaf nodes is compressed if the available size of the remaining coordinate space is greater than a size threshold; or where the data corresponding to each of the one or more leaf nodes is not compressed if the available size of the remaining coordinate space is less than or equal to the size threshold.

Aspect 17 is the apparatus of any of aspects 1 to 16, where the at least one processor is further configured to: adjust at least one of a position of the plurality of primitives or a vertex order of the plurality of primitives upon compressing the data corresponding to each of the one or more leaf nodes.

Aspect 18 is the apparatus of any of aspects 1 to 17, where estimating the compressibility of each of the one or more leaf nodes identifies a configuration for storage of the data corresponding to each of the one or more leaf nodes, and where the data corresponding to each of the plurality of nodes is not compressed if the node is estimated to be not compressible.

Aspect 19 is the apparatus of any of aspects 1 to 18, where the plurality of nodes is associated with a binary tree bounding volume hierarchy (BVH), such that the one or more leaf nodes are child nodes for at least one of the one or more internal nodes.

Aspect 20 is the apparatus of any of aspects 1 to 19, where the plurality of bounding boxes is a plurality of axis-aligned bounding boxes (AABBs).

Aspect 21 is the apparatus of any of aspects 1 to 20, where the compression of the data corresponding to each of the one or more leaf nodes is associated with a ray tracing procedure.

Aspect 22 is the apparatus of any of aspects 1 to 21, where the apparatus is a wireless communication device, further including at least one of an antenna or a transceiver coupled to the at least one processor.

Aspect 23 is a method of graphics processing for implementing any of aspects 1 to 22.

Aspect 24 is an apparatus for graphics processing including means for implementing any of aspects 1 to 22.

Aspect 25 is a non-transitory computer-readable medium storing computer executable code, the code when executed by at least one processor causes the at least one processor to implement any of aspects 1 to 22.

What is claimed is:
1. An apparatus for graphics processing, comprising:
a memory; and
at least one processor coupled to the memory and configured to:
allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes;
identify whether each of the plurality of nodes is one of the one or more internal nodes or one of the one or more leaf nodes;
estimate a compressibility of each of the one or more leaf nodes if a number of primitives associated with the leaf node is greater than 1, the compressibility of each leaf node corresponding to whether the leaf node is compressible; and
refrain from compressing data corresponding to each of the one or more leaf nodes if the leaf node is estimated to be not compressible,
wherein to estimate the compressibility of each of the one or more leaf nodes, the at least one processor is configured to identify a number of a plurality of unique coordinates of the leaf node.

2. The apparatus of claim 1, wherein the at least one processor is further configured to:
compress the data corresponding to each of the one or more leaf nodes if the leaf node is estimated to be compressible; and
store the data corresponding to each of the one or more leaf nodes that is estimated to be compressible.

3. The apparatus of claim 2, wherein the data corresponding to each of the one or more leaf nodes includes at least one of: one or more primitive coordinates of the leaf node, one or more primitive identifiers (IDs) of the leaf node, or at least one vertex permutation of the leaf node.

4. The apparatus of claim 2, wherein the at least one processor is further configured to:
encode the data corresponding to each of the one or more leaf nodes that is estimated to be compressible prior to storing the data corresponding to the leaf node, such that the data corresponding to the leaf node is stored in an encoded format.

5. The apparatus of claim 1, wherein to estimate the compressibility of each of the one or more leaf nodes, the at least one processor is further configured to: sort the plurality of unique coordinates of the leaf node.

6. The apparatus of claim 1, wherein to estimate the compressibility of each of the one or more leaf nodes, the at least one processor is further configured to: calculate a size of the plurality of unique coordinates of the leaf node for storage.

7. The apparatus of claim 6, wherein to estimate the compressibility of each of the one or more leaf nodes, the at least one processor is further configured to: store the plurality of unique coordinates based on the calculated size, wherein the plurality of unique coordinates is stored as leaf node information.

8. The apparatus of claim 1, wherein to estimate the compressibility of each of the one or more leaf nodes, the at least one processor is configured to:
adjust a number of primitives associated with the leaf node; and
calculate a number of primitive identifier (ID) bytes for the leaf node.

9. The apparatus of claim 1, wherein to estimate the compressibility of each of the one or more leaf nodes, the at least one processor is configured to: identify whether a product of a number of a plurality of unique coordinates of the leaf node and a minimum size per coordinate of the leaf node is greater than a maximum coordinate size of the leaf node.

10. The apparatus of claim 9, wherein to estimate the compressibility of each of the one or more leaf nodes, the at least one processor is further configured to: identify whether a minimum size to store the plurality of unique coordinates is greater than the maximum coordinate size of the leaf node.

11. The apparatus of claim 10, wherein to estimate the compressibility of each of the one or more leaf nodes, the at least one processor is further configured to: identify whether a size difference between at least two of the plurality of unique coordinates is greater than a maximum coordinate difference size of the leaf node.

12. The apparatus of claim 11, wherein to estimate the compressibility of each of the one or more leaf nodes, the at least one processor is further configured to: identify whether a sum of the minimum size per coordinate of the leaf node and a minimum size of primitive identifiers (IDs) of the leaf node is greater than the maximum coordinate size of the leaf node.

13. The apparatus of claim 12, wherein to estimate the compressibility of each of the one or more leaf nodes, the at least one processor is further configured to: detect an available size of remaining coordinate space of the plurality of unique coordinates in the leaf node for a compression of the plurality of unique coordinates.

14. The apparatus of claim 13, wherein the data corresponding to each of the one or more leaf nodes is compressed if the available size of the remaining coordinate space is greater than a size threshold; or the data corresponding to each of the one or more leaf nodes is not compressed if the available size of the remaining coordinate space is less than or equal to the size threshold.

15. The apparatus of claim 1, wherein the at least one processor is further configured to:
adjust at least one of a position of the plurality of primitives or a vertex order of the plurality of primitives upon compressing the data corresponding to each of the one or more leaf nodes.

16. The apparatus of claim 1, wherein estimating the compressibility of each of the one or more leaf nodes identifies a configuration for storage of the data corresponding to each of the one or more leaf nodes.

17. The apparatus of claim 1, wherein the plurality of nodes is associated with a binary tree bounding volume hierarchy (BVH), such that the one or more leaf nodes are child nodes for at least one of the one or more internal nodes.

18. The apparatus of claim 1, wherein the plurality of bounding boxes is a plurality of axis-aligned bounding boxes (AABBs), and wherein the compression of the data corresponding to each of the one or more leaf nodes is associated with a ray tracing procedure.

19. The apparatus of claim 1, wherein the apparatus is a wireless communication device, further comprising at least one of an antenna or a transceiver coupled to the at least one processor.

20. A method of graphics processing, comprising:
allocating each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes;
identifying whether each of the plurality of nodes is one of the one or more internal nodes or one of the one or more leaf nodes;
estimating a compressibility of each of the one or more leaf nodes, the compressibility of each leaf node corresponding to whether the leaf node is compressible; and
refraining from compressing data corresponding to each of the one or more leaf nodes if the leaf node is estimated to be not compressible,
wherein estimating the compressibility of each of the one or more leaf nodes comprises identifying a number of a plurality of unique coordinates of the leaf node.

21. The method of claim 20, further comprising:
compressing the data corresponding to each of the one or more leaf nodes if the leaf node is estimated to be compressible; and
storing the data corresponding to each of the one or more leaf nodes that is estimated to be compressible, wherein the data corresponding to each of the one or more leaf nodes includes at least one of: one or more primitive coordinates of the leaf node, one or more primitive identifiers (IDs) of the leaf node, or at least one vertex permutation of the leaf node.

22. The method of claim 21, further comprising:
encoding the data corresponding to each of the one or more leaf nodes that is estimated to be compressible prior to storing the data corresponding to the leaf node, such that the data corresponding to the leaf node is stored in an encoded format.

23. The method of claim 20, wherein estimating the compressibility of each of the one or more leaf nodes further comprises sorting the plurality of unique coordinates of the leaf node.

24. The method of claim 20, wherein estimating the compressibility of each of the one or more leaf nodes further comprises:
calculating a size of the plurality of unique coordinates of the leaf node for storage; and
storing the plurality of unique coordinates based on the calculated size, wherein the plurality of unique coordinates is stored as leaf node information.

25. The method of claim 20, wherein estimating the compressibility of each of the one or more leaf nodes comprises:
adjusting a number of primitives associated with the leaf node; and
calculating a number of primitive identifier (ID) bytes for the leaf node.

26. An apparatus for graphics processing, comprising:
means for allocating each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes;
means for identifying whether each of the plurality of nodes is one of the one or more internal nodes or one of the one or more leaf nodes;
means for estimating a compressibility of each of the one or more leaf nodes, the compressibility of each leaf node corresponding to whether the leaf node is compressible; and
means for refraining from compressing data corresponding to each of the one or more leaf nodes if the leaf node is estimated to be not compressible,
wherein the means for estimating the compressibility of each of the one or more leaf nodes comprises means for identifying a number of a plurality of unique coordinates of the leaf node.

27. A non-transitory computer-readable medium storing computer executable code for graphics processing, the code when executed by a processor causes the processor to:
allocate each of a plurality of primitives in a scene into one of a plurality of bounding boxes, each of the plurality of primitives including one or more vertices, each of the plurality of bounding boxes corresponding to a plurality of nodes including one or more internal nodes and one or more leaf nodes;
identify whether each of the plurality of nodes is one of the one or more internal nodes or one of the one or more leaf nodes;
estimate a compressibility of each of the one or more leaf nodes, the compressibility of each leaf node corresponding to whether the leaf node is compressible; and
refrain from compressing data corresponding to each of the one or more leaf nodes if the leaf node is estimated to be not compressible,
wherein to estimate the compressibility of each of the one or more leaf nodes, the code when executed by the processor causes the processor to identify a number of a plurality of unique coordinates of the leaf node.

* * * * *